(12) United States Patent
Kawagishi et al.

(10) Patent No.: US 8,840,257 B2
(45) Date of Patent: Sep. 23, 2014

(54) ANTIREFLECTIVE FILM AND OPTICAL ELEMENT

(71) Applicant: Hoya Corporation, Tokyo (JP)

(72) Inventors: Shuichiro Kawagishi, Shinjuku-ku (JP); Teruo Yamashita, Shinjuku-ku (JP)

(73) Assignee: Hoya Corporation, Tokyo (JP)

(*) Notice: Subject to any disclaimer, the term of this patent is extended or adjusted under 35 U.S.C. 154(b) by 17 days.

(21) Appl. No.: 13/661,270

(22) Filed: Oct. 26, 2012

(65) Prior Publication Data

US 2013/0201562 A1 Aug. 8, 2013

(30) Foreign Application Priority Data

Oct. 28, 2011 (JP) .................. 2011-237551
Oct. 24, 2012 (JP) .................. 2012-235205

(51) Int. Cl.
*G02B 27/00* (2006.01)
*G02B 1/11* (2006.01)
*G02B 3/04* (2006.01)

(52) U.S. Cl.
CPC ... *G02B 1/11* (2013.01); *G02B 3/04* (2013.01); *G02B 1/115* (2013.01); *G02B 27/0018* (2013.01)
USPC .......................................... 359/601; 359/722

(58) Field of Classification Search
USPC .................................. 359/601, 722
See application file for complete search history.

(56) References Cited

U.S. PATENT DOCUMENTS

2005/0225878 A1  10/2005  Tanaka et al.
2010/0020402 A1*  1/2010  Imura et al. .............. 359/601

FOREIGN PATENT DOCUMENTS

| JP | 08-146307 | 6/1996 |
| JP | 2005-284040 A | 10/2005 |
| JP | 2008-026820 A | 2/2008 |
| JP | 2010-217445 A | 9/2010 |
| WO | 2006/030848 A1 | 3/2006 |

* cited by examiner

*Primary Examiner* — James Jones
(74) *Attorney, Agent, or Firm* — Sughrue Mion, PLLC

(57) ABSTRACT

An antireflection film, including an optical element, formed on an optical surface of an optical member and preventing reflection of a light beam incident on the optical surface. It has a maximum reflectance P1 in a first wavelength region and a maximum reflectance P2 in a second wavelength region at a wavelength side longer than the first wavelength region, and satisfies a relation of P1>P2, as a spectral reflectance property when a light beam is incident on the optical surface at a 0 degree incident angle. It also shifts a wavelength range where the reflectance is a specific value or less, to a wavelength longer than the second wavelength region, the reflectance in the second wavelength region decreases, and the reflectance in the first wavelength region increases so that a luminance difference is small between a ghost in the first wavelength region and the second wavelength region.

8 Claims, 22 Drawing Sheets

FIG. 5

(FIRST EXAMPLE)

| | | FILM STRUCTURE | | | | |
|---|---|---|---|---|---|---|
| | CONSTITUTIONAL MATERIAL | REFRACTIVE INDEX n | | FILM THICKNESS d(nm) | OPTICAL FILM THICKNESS COEFFICIENT (k) | $\lambda_0$(nm) |
| BASE MATERIAL | M-TAF101 | — | 1.7713 | — | — | 550 |
| FIRST LAYER | Al$_2$O$_3$ | M | 1.6384 | 175.1 | x  2.086 | 550 |
| SECOND LAYER | ZrO$_2$+TiO$_2$ | H | 2.0368 | 138.54 | y  2.052 | 550 |
| THIRD LAYER | MgF$_2$ | L | 1.3951 | 99.83 | z  1.013 | 550 |
| MEDIUM | AIR | — | 1.0000 | — | — | 550 |

FIG. 6

(MODIFIED EXAMPLE 1 OF FIRST EXAMPLE)

| | | FILM STRUCTURE | | | | |
|---|---|---|---|---|---|---|
| | CONSTITUTIONAL MATERIAL | REFRACTIVE INDEX n | | FILM THICKNESS d(nm) | OPTICAL FILM THICKNESS COEFFICIENT (k) | $\lambda_0$(nm) |
| BASE MATERIAL | M-TAF101 | — | 1.7713 | — | — | 550 |
| FIRST LAYER | Al$_2$O$_3$ | M | 1.6384 | 87.55 | x  1.043 | 550 |
| | Al$_2$O$_3$ | | 1.6384 | 87.55 | 1.043 | 550 |
| SECOND LAYER | ZrO$_2$+TiO$_2$ | H | 2.0368 | 69.27 | y  1.026 | 550 |
| | ZrO$_2$+TiO$_2$ | | 2.0368 | 69.27 | 1.026 | 550 |
| THIRD LAYER | MgF$_2$ | L | 1.3951 | 99.83 | z  1.013 | 550 |
| MEDIUM | AIR | — | 1.0000 | — | — | 550 |

FIG.8

MODIFIED EXAMPLE 2
OF FIRST EXAMPLE)

| FILM STRUCTURE ||||||| |
|---|---|---|---|---|---|---|
| | CONSTITUTIONAL MATERIAL | REFRACTIVE INDEX n | FILM THICKNESS d(nm) | OPTICAL FILM THICKNESS COEFFICIENT (k) | | $\lambda_0$(nm) |
| BASE MATERIAL | M-TAF101 | — | 1.7713 | — | — | 550 |
| FIRST LAYER | $Al_2O_3$ | M | 1.6181 | 86.83 | x | 1.022 | 550 |
| | $Al_2O_3$ | | 1.6633 | 89.37 | | 1.081 | 550 |
| SECOND LAYER | $ZrO_2+TiO_2$ | H | 1.9583 | 70.23 | y | 1.000 | 550 |
| | $ZrO_2+TiO_2$ | | 1.9583 | 70.23 | | 1.000 | 550 |
| THIRD LAYER | $MgF_2$ | L | 1.3951 | 100.29 | z | 1.018 | 550 |
| MEDIUM | AIR | — | 1.0000 | — | — | 550 |

FIG.10

(SECOND EXAMPLE)

| | CONSTITUTIONAL MATERIAL | REFRACTIVE INDEX n | | FILM THICKNESS d(nm) | OPTICAL FILM THICKNESS COEFFICIENT (k) | | $\lambda_0$(nm) |
|---|---|---|---|---|---|---|---|
| | | FILM STRUCTURE | | | | | |
| BASE MATERIAL | M-BACD12 | — | | 1.5852 | — | | 550 |
| FIRST LAYER | $MgF_2$ | L | 1.3951 | 20.39 | x1 | 0.207 | 550 |
| SECOND LAYER | $Al_2O_3$ | M | 1.6633 | 113.11 | x2 | 1.368 | 550 |
| THIRD LAYER | $ZrO_2+TiO_2$ | H | 1.9583 | 142.73 | y | 2.033 | 550 |
| FOURTH LAYER | $MgF_2$ | L | 1.3951 | 101.81 | z | 1.033 | 550 |
| MEDIUM | AIR | — | | 1.0000 | — | | 550 |

FIG.12

(THIRD EXAMPLE)

| FILM STRUCTURE | | | | | | | |
|---|---|---|---|---|---|---|---|
| | CONSTITUTIONAL MATERIAL | REFRACTIVE INDEX n | | FILM THICKNESS d(nm) | OPTICAL FILM THICKNESS COEFFICIENT (k) | | $\lambda_0$(nm) |
| BASE MATERIAL | M-BACD12 | — | 1.5852 | — | — | | 550 |
| FIRST LAYER | $SiO_2$ | L | 1.4649 | 33.05 | x1 | 0.352 | 550 |
| SECOND LAYER | $Al_2O_3$ | M | 1.6633 | 108.67 | x2 | 1.315 | 550 |
| THIRD LAYER | $ZrO_2 + TiO_2$ | H | 1.9583 | 143.75 | y | 2.047 | 550 |
| FOURTH LAYER | $MgF_2$ | L | 1.3951 | 101.59 | z | 1.031 | 550 |
| MEDIUM | AIR | — | 1.0000 | — | — | | 550 |

FIG.14

(FOURTH EXAMPLE)

| FILM STRUCTURE | | | | | | | |
|---|---|---|---|---|---|---|---|
| | CONSTITUTIONAL MATERIAL | REFRACTIVE INDEX n | | FILM THICKNESS d(nm) | OPTICAL FILM THICKNESS COEFFICIENT (k) | | $\lambda_0$(nm) |
| BASE MATERIAL | M-TAFD305 | — | 1.8559 | — | — | | 550 |
| FIRST LAYER | $MgF_2$ | L | 1.3828 | 23.88 | x1 | 0.240 | 550 |
| SECOND LAYER | $ZrO_2$ | H | 2.0034 | 42.91 | y1 | 0.625 | 550 |
| THIRD LAYER | $MgF_2$ | L | 1.3828 | 23.66 | x2 | 0.238 | 550 |
| FOURTH LAYER | $ZrO_2$ | H | 2.0034 | 158.96 | y2 | 2.316 | 550 |
| FIFTH LAYER | $MgF_2$ | L | 1.3828 | 102.19 | z | 1.028 | 550 |
| MEDIUM | AIR | — | 1.0000 | — | — | | 550 |

FIG.16

(FIFTH EXAMPLE)

| FILM STRUCTURE | | | | | | |
|---|---|---|---|---|---|---|
| | CONSTITUTIONAL MATERIAL | REFRACTIVE INDEX n | FILM THICKNESS d(nm) | OPTICAL FILM THICKNESS COEFFICIENT (k) | | $\lambda_0$(nm) |
| BASE MATERIAL | M-TAFD305 | — | 1.8559 | — | — | 550 |
| FIRST LAYER | $ZrO_2$ | H | 2.0034 | 32.58 | y1 | 0.475 | 550 |
| SECOND LAYER | $MgF_2$ | L | 1.3828 | 11.59 | x1 | 0.117 | 550 |
| THIRD LAYER | $ZrO_2$ | H | 2.0034 | 87.33 | y2 | 1.272 | 550 |
| FOURTH LAYER | $MgF_2$ | L | 1.3828 | 16.76 | x2 | 0.169 | 550 |
| FIFTH LAYER | $ZrO_2$ | H | 2.0034 | 38.98 | y3 | 0.568 | 550 |
| SIXTH LAYER | $MgF_2$ | L | 1.3828 | 111.02 | z | 1.116 | 550 |
| MEDIUM | AIR | — | 1.0000 | — | — | 550 |

FIG.18

(SIXTH EXAMPLE)

| FILM STRUCTURE | | | | | | |
|---|---|---|---|---|---|---|
| | CONSTITUTIONAL MATERIAL | REFRACTIVE INDEX n | | FILM THICKNESS d(nm) | OPTICAL FILM THICKNESS COEFFICIENT (k) | $\lambda_0$(nm) |
| BASE MATERIAL | M-TAFD305 | — | 1.8559 | — | — | 550 |
| FIRST LAYER | MgF$_2$ | L | 1.3828 | 18.83 | x1 | 0.189 | 550 |
| SECOND LAYER | ZrO$_2$ | H | 2.0034 | 46.14 | y1 | 0.672 | 550 |
| THIRD LAYER | MgF$_2$ | L | 1.3828 | 24.11 | x2 | 0.242 | 550 |
| FOURTH LAYER | ZrO$_2$ | H | 2.0034 | 80.84 | y2 | 1.178 | 550 |
| FIFTH LAYER | MgF$_2$ | L | 1.3828 | 16.13 | x3 | 0.162 | 550 |
| SIXTH LAYER | ZrO$_2$ | H | 2.0034 | 47.83 | y3 | 0.697 | 550 |
| SEVENTH LAYER | MgF$_2$ | L | 1.3828 | 113.98 | z | 1.146 | 550 |
| MEDIUM | AIR | — | 1.0000 | — | — | 550 |

| INCIDENT ANGLE | L1 | | | L2 | | | ΔLa | | |
|---|---|---|---|---|---|---|---|---|---|
| | R | G | B | R | G | B | R | G | B |
| 36° | 0.121 | 0.054 | 0.050 | 0.052 | 0.050 | 0.049 | 43% | 92% | 99% |
| 37° | 1.927 | 0.284 | 0.071 | 0.421 | 0.129 | 0.074 | 22% | 46% | 105% |
| 40° | 5.200 | 1.596 | 0.425 | 1.077 | 0.874 | 0.446 | 21% | 55% | 105% |
| 50° | 5.220 | 1.923 | 1.056 | 1.203 | 1.168 | 0.976 | 23% | 61% | 92% |
| 60° | 4.260 | 1.575 | 0.895 | 1.025 | 0.997 | 0.824 | 24% | 63% | 92% |
| 70° | 3.307 | 1.242 | 0.718 | 0.831 | 0.804 | 0.664 | 25% | 65% | 93% |
| 76° | 1.875 | 0.734 | 0.375 | 0.491 | 0.438 | 0.365 | 26% | 60% | 97% |

(B)

| INCIDENT ANGLE | L1 | | | L2 | | | ΔLa | | |
|---|---|---|---|---|---|---|---|---|---|
| | R | G | B | R | G | B | R | G | B |
| 42° | 1.095 | 0.302 | 0.202 | 0.225 | 0.259 | 0.171 | 21% | 86% | 85% |
| 43° | 1.379 | 0.374 | 0.229 | 0.274 | 0.307 | 0.194 | 20% | 82% | 85% |
| 50° | 3.052 | 0.939 | 0.485 | 0.611 | 0.634 | 0.422 | 20% | 68% | 87% |
| 60° | 3.864 | 1.438 | 0.777 | 0.890 | 0.924 | 0.710 | 23% | 64% | 91% |
| 70° | 2.549 | 0.974 | 0.623 | 0.593 | 0.654 | 0.574 | 23% | 67% | 92% |
| 76° | 1.171 | 0.475 | 0.282 | 0.274 | 0.290 | 0.269 | 23% | 61% | 99% |

(C)

| INCIDENT ANGLE | L1 | | | L2 | | | ΔLa | | |
|---|---|---|---|---|---|---|---|---|---|
| | R | G | B | R | G | B | R | G | B |
| 54° | 1.089 | 0.323 | 0.230 | 0.241 | 0.280 | 0.189 | 22% | 87% | 82% |
| 55° | 1.129 | 0.335 | 0.236 | 0.249 | 0.288 | 0.196 | 22% | 86% | 83% |
| 60° | 1.262 | 0.382 | 0.254 | 0.277 | 0.307 | 0.214 | 22% | 80% | 84% |
| 70° | 1.105 | 0.358 | 0.217 | 0.239 | 0.261 | 0.193 | 22% | 73% | 89% |
| 76° | 0.227 | 0.087 | 0.050 | 0.047 | 0.055 | 0.046 | 21% | 64% | 91% |

| INCIDENT ANGLE | L1 | | | L3 | | | ΔLb | | |
|---|---|---|---|---|---|---|---|---|---|
| | R | G | B | R | G | B | R | G | B |
| 36° | 0.121 | 0.054 | 0.050 | 0.108 | 0.117 | 0.110 | 90% | 215% | 221% |
| 37° | 1.927 | 0.284 | 0.071 | 0.557 | 0.229 | 0.153 | 29% | 81% | 216% |
| 40° | 5.200 | 1.596 | 0.425 | 1.365 | 1.247 | 0.729 | 26% | 78% | 172% |
| 50° | 5.220 | 1.923 | 1.056 | 1.476 | 1.577 | 1.483 | 28% | 82% | 140% |
| 60° | 4.260 | 1.575 | 0.895 | 1.243 | 1.327 | 1.229 | 29% | 84% | 137% |
| 70° | 3.307 | 1.242 | 0.718 | 0.975 | 1.056 | 0.971 | 29% | 85% | 135% |
| 76° | 1.875 | 0.734 | 0.375 | 0.507 | 0.543 | 0.495 | 27% | 74% | 132% |

(B)

| INCIDENT ANGLE | L1 | | | L3 | | | ΔLb | | |
|---|---|---|---|---|---|---|---|---|---|
| | R | G | B | R | G | B | R | G | B |
| 42° | 1.095 | 0.302 | 0.202 | 0.477 | 0.444 | 0.365 | 44% | 147% | 180% |
| 43° | 1.379 | 0.374 | 0.229 | 0.553 | 0.503 | 0.400 | 40% | 135% | 175% |
| 50° | 3.052 | 0.939 | 0.485 | 0.948 | 0.944 | 0.759 | 31% | 100% | 156% |
| 60° | 3.864 | 1.438 | 0.777 | 1.123 | 1.242 | 1.085 | 29% | 86% | 140% |
| 70° | 2.549 | 0.974 | 0.623 | 0.747 | 0.872 | 0.847 | 29% | 89% | 136% |
| 76° | 1.171 | 0.475 | 0.282 | 0.304 | 0.373 | 0.372 | 26% | 79% | 132% |

(C)

| INCIDENT ANGLE | L1 | | | L3 | | | ΔLb | | |
|---|---|---|---|---|---|---|---|---|---|
| | R | G | B | R | G | B | R | G | B |
| 54° | 1.089 | 0.323 | 0.230 | 0.430 | 0.431 | 0.370 | 39% | 133% | 161% |
| 55° | 1.129 | 0.335 | 0.236 | 0.439 | 0.438 | 0.375 | 39% | 131% | 159% |
| 60° | 1.262 | 0.382 | 0.254 | 0.449 | 0.455 | 0.387 | 36% | 119% | 152% |
| 70° | 1.105 | 0.358 | 0.217 | 0.342 | 0.366 | 0.312 | 31% | 102% | 144% |
| 76° | 0.227 | 0.087 | 0.050 | 0.059 | 0.074 | 0.068 | 26% | 85% | 136% |

FIG.22
(A)
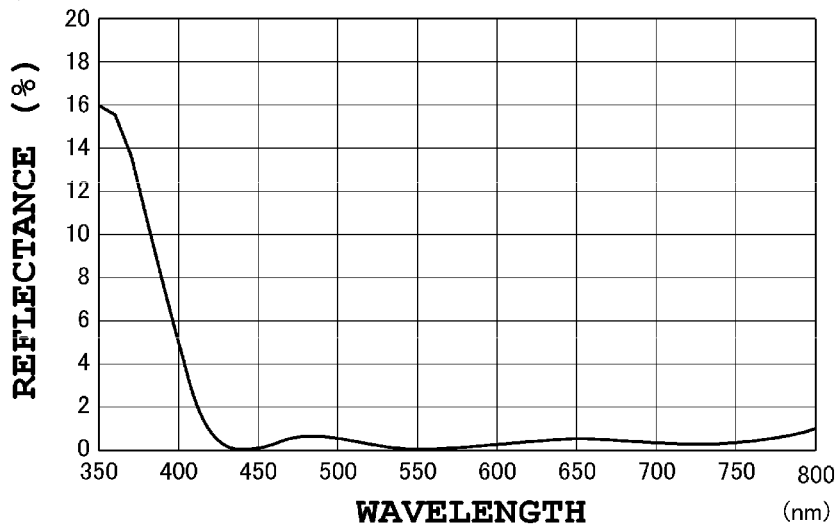
(B)
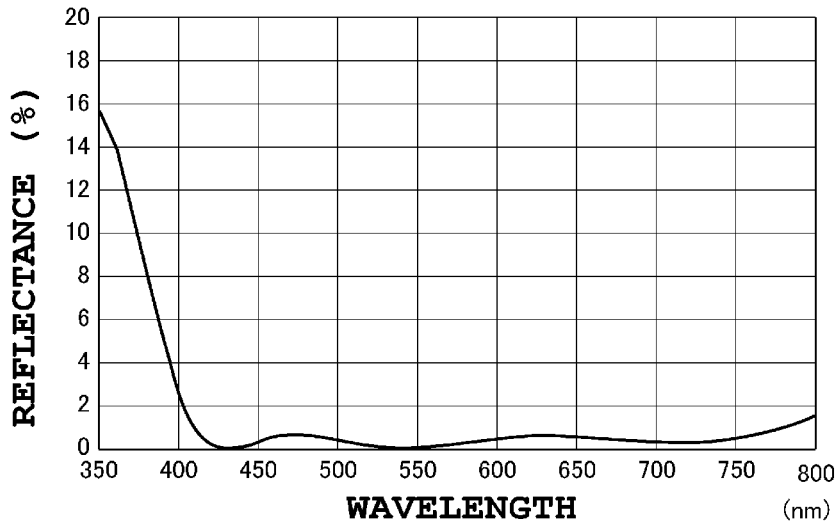

FIG. 23
(A) 40 DEGREES SPECTRUM CURVE
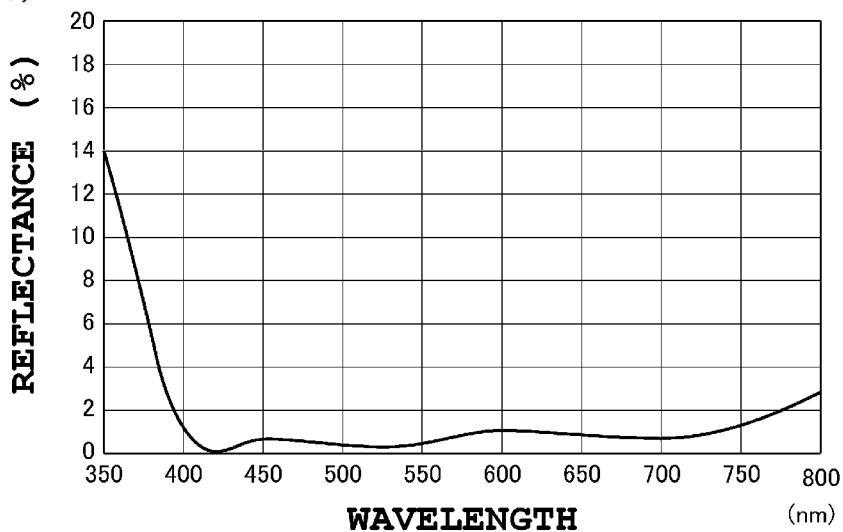
(B) 50 DEGREES SPECTRUM CURVE
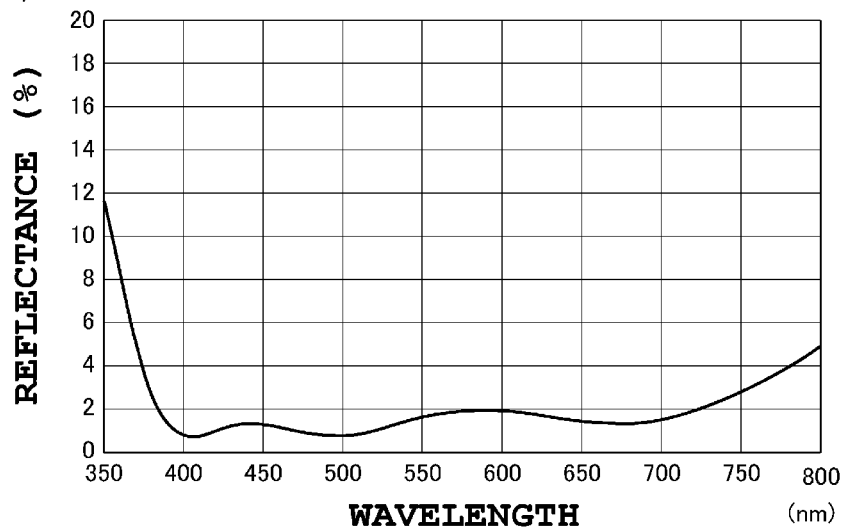

FIG.24
(A)
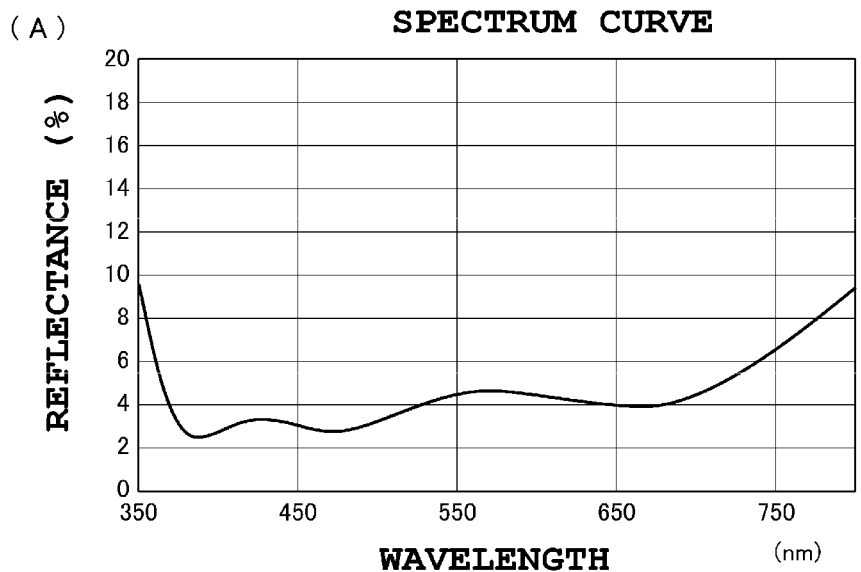
(B)
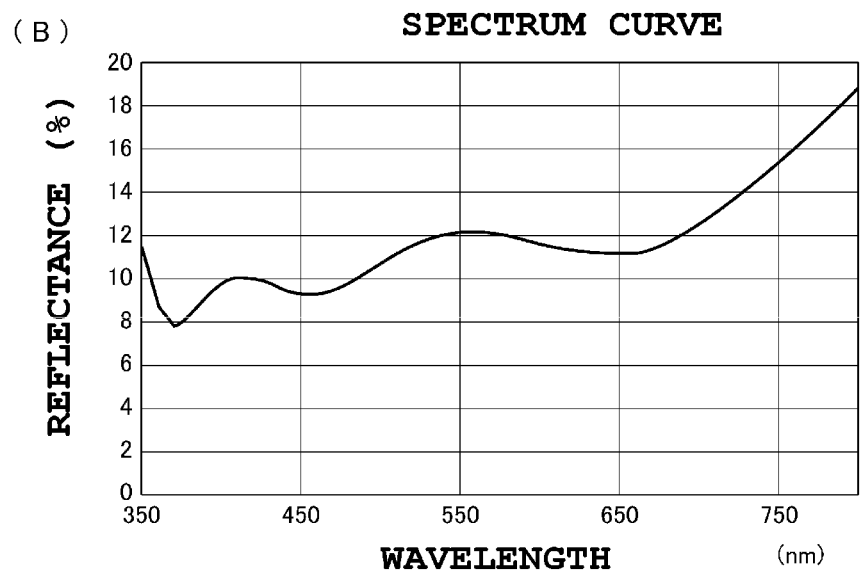

ANTIREFLECTIVE FILM AND OPTICAL ELEMENT

BACKGROUND

1. Technical Field

The present invention relates to an antireflection film and an optical element including the antireflection film.

2. Description of Related Art

An antireflection film is provided on a surface of a lens or a cover glass used in a photographic camera (including a digital camera), a broadcast camera, a monitoring camera installed on a vehicle or outdoor, and an astronomical telescope, etc., for suppressing a loss of a transmitted light, or preventing a ghost or flare. The antireflection film having a following film structure is proposed: the antireflection film is designed so that a low refractive index film and a high refractive index film are laminated, and a reflected light generated on an interface between each layer, and a light beam incident on each layer are canceled each other by interference.

For example, patent document 1 discloses an antireflection film composed of four layers having a reflectance of 0.5% when an incident angle of the light beam is 0 degree or more and 25 degrees or less, and a reflectance of 3.5% or less when the incident angle of a light beam is 0 degree or more and 60 degrees or less, when the light beam with a wavelength region of 400 nm or more and 700 nm or less is incident on an optical surface of an optical member. Further, patent document 2 discloses an antireflection film composed of 12 layers having a reflectance of less than 1% measured at an incident angle of 5 degrees in a wavelength range of 280 to 700 nm. In addition, patent document 3 discloses an antireflection film composed of 11 layer-laminated film and an antireflection film composed of 13 layer-laminated film.

The ghost and the flare are generated as follows: alight incident on a lens is reflected by a lens surface, and a light reflected thereby is incident on an imaging surface. Therefore, in order to reduce the ghost and the flare, it is effective to provide the antireflection film on the lens surface, having a low reflectance in a visible light region which can be perceived by a human eye.

Patent Document 1:
Japanese Patent Laid Open Publication No. 2005-284040
Patent Document 2:
Japanese Patent Laid Open Publication No. 2008-26820
Patent Document 3:
Japanese Patent Laid Open Publication No. 2010-217445

In recent years, a higher optical performance has been requested in an optical system, and therefore improvement of a performance of the antireflection film is also requested accordingly. Also, in recent years, a larger diameter and a wider angle of a lens is in progress. Accordingly, an incident angle range of the light beam incident on the lens is likely to be expanded. When the incident angle range is expanded, the ghost is easily generated.

In a case of a concave meniscus lens with an optical surface formed into a spherical surface, a curvature of the optical surface is fixed, and therefore a ghost light reflected by the optical surface is likely to be uniformly dispersed on an imaging surface. Meanwhile, in a case of a concave meniscus lens with the optical surface formed into an aspherical surface, a variation rate of a surface angle or the curvature of the optical surface is not formed uniformly. Therefore, the ghost light reflected by the optical surface is likely to be concentrated on apart of the imaging surface. Therefore, in a spherical concave meniscus lens, a remarkable red ghost is sometimes generated in a part of an image when the antireflection film having the same spectral reflectance property as the spherical concave meniscus lens, is formed on an aspherical concave meniscus lens, even if the ghost is sufficiently suppressed to be low by forming the antireflection film on the lens.

In a related art, the reflectance in the visible light region is uniformly suppressed to be low by forming the antireflection film into a multilayer film, and by suitably setting a parameter such as a constitutional material, a refractive index, and a film thickness of each layer.

However, in recent years, it is difficult in some cases to sufficiently satisfy an optical performance requested in an optical system only by uniformly suppressing the reflectance to be low in the visible light region.

A main object of the present invention is to provide the optical element including the antireflection film capable of satisfying the optical performance requested in the optical system in recent years, and capable of effectively reducing the ghost, even in a case of the aspherical lens, particularly such as the concave meniscus lens with the optical surface formed into the aspherical surface.

SUMMARY OF THE INVENTION

According to a first aspect of the present invention, there is provided an antireflection film formed on an optical surface of an optical member, and is configured to prevent a reflection of a light beam incident on the optical surface, wherein a maximum reflectance P1 in a first wavelength region and a maximum reflectance P2 in a second wavelength region at a wavelength side longer than the first wavelength region, satisfies a relation of P1>P2, as a spectral reflectance property when a light beam is incident on the optical surface at an incident angle of 0 degree; and by shifting a wavelength range where the reflectance is a specific value or less, to a wavelength side longer than the second wavelength region, the reflectance in the second wavelength region is decreased, and the reflectance in the first wavelength region is increased so that a luminance difference is small between a ghost in the first wavelength region and a ghost in the second wavelength region.

According to a second aspect of the present invention, there is provided the antireflection film of the first aspect, including:
a first layer having a first refractive index;
a second layer having a second refractive index; and
a third layer having a third refractive index,
which are sequentially laminated from the optical member side to an air side, wherein when the second refractive index is larger than the first refractive index and the first refractive index is larger than the third refractive index, a maximum value of a reflectance at a short wavelength side in a wavelength region of 450 nm to 550 nm when a light beam is incident on the optical surface at the incident angle of 0 degree, is larger than a maximum value of a reflectance at a long wavelength side in a wavelength region of 600 nm to 750 nm.

According to a third aspect of the present invention, there is provided the antireflection film of the second aspect, wherein the first layer is composed of a plurality of layers in which at least one layer having the second refractive index and at least one layer having the third refractive index are combined.

According to a fourth aspect of the present invention, there is provided the antireflection film of any one of the first to third aspects, wherein a wavelength having the maximum reflectance P1 is 470 nm or more and less than 550 nm.

According to a fifth aspect of the present invention, there is provided the antireflection film of any one of the second to fourth aspects, wherein the first refractive index is 1.55 or more and less than 1.80, the second refractive index is 1.80 or more and 2.60 or less, and the third refractive index is 1.30 or more and less than 1.55.

According to a sixth aspect of the present invention, there is provided the antireflection film of any one of the second to fifth aspects, wherein the first layer is made of a material including any one of aluminum oxide, zirconium oxide, and silicon oxide, and the second layer is made of a material including any one of aluminum oxide, zirconium oxide, titanium oxide, niobium oxide, and tantalum oxide, and the third layer is made of a material including either magnesium fluoride or silicon oxide.

According to a seventh aspect of the present invention, there is provided an optical element including an optical member having an optical surface, and an antireflection film formed on the optical surface, wherein the antireflection film is the film in which a maximum reflectance P1 in a first wavelength region and a maximum reflectance P2 in a second wavelength region at a wavelength side longer than the first wavelength region, satisfies a relation of p1>P2 as a spectral reflectance property when a light beam is incident on the optical surface at an incident angle of 0 degree; and by shifting a wavelength range where the reflectance is a specific value or less, to a wavelength side longer than the second wavelength region, the reflectance in the second wavelength region is decreased, and the reflectance in the first wavelength region is increased so that a luminance difference is small between a ghost in the first wavelength region and a ghost in the second wavelength region.

According to an eighth aspect of the present invention, there is provided the optical element of the seventh aspect, wherein the optical member is a concave meniscus lens having a concave surface formed into an aspherical shape, and the antireflection film is formed on the concave surface of the concave meniscus lens.

According to the present invention, the antireflection film of a smaller number of layers can be formed, and therefore variation in optical properties is small over the whole body of the antireflection film, and the ghost can be effectively reduced.

BRIEF DESCRIPTION OF THE DRAWINGS

FIG. 5 is a view showing a specific example (first example) of the antireflection film.

FIG. 6 is a view showing a modified example 1 of a first example of the antireflection film.

FIG. 8 is a view showing a modified example 2 of the first example of the antireflection film.

FIG. 10 is a view showing a specific second example of the antireflection film.

FIG. 12 is a view showing a specific third example of the antireflection film.

FIG. 14 is a view showing a specific fourth example of the antireflection film.

FIG. 16 is a view showing a specific fifth example of the antireflection film.

FIG. 18 is a view showing a specific sixth example of the antireflection film.

FIG. 20 is a view showing a result (number 1) of a simulation by inventors of the present invention.

FIG. 21 is a view showing a result (number 2) of a simulation by inventors of the present invention.

FIG. 22 is a view showing the spectral reflectance property at an incident angle of 20 degrees and 30 degrees.

FIG. 23 is a view showing the spectral reflectance property at an incident angle of 40 degrees and 50 degrees.

FIG. 24 is a view showing the spectral reflectance property at an incident angle of 60 degrees and 70 degrees.

DETAILED DESCRIPTION OF THE INVENTION

Figure 1:
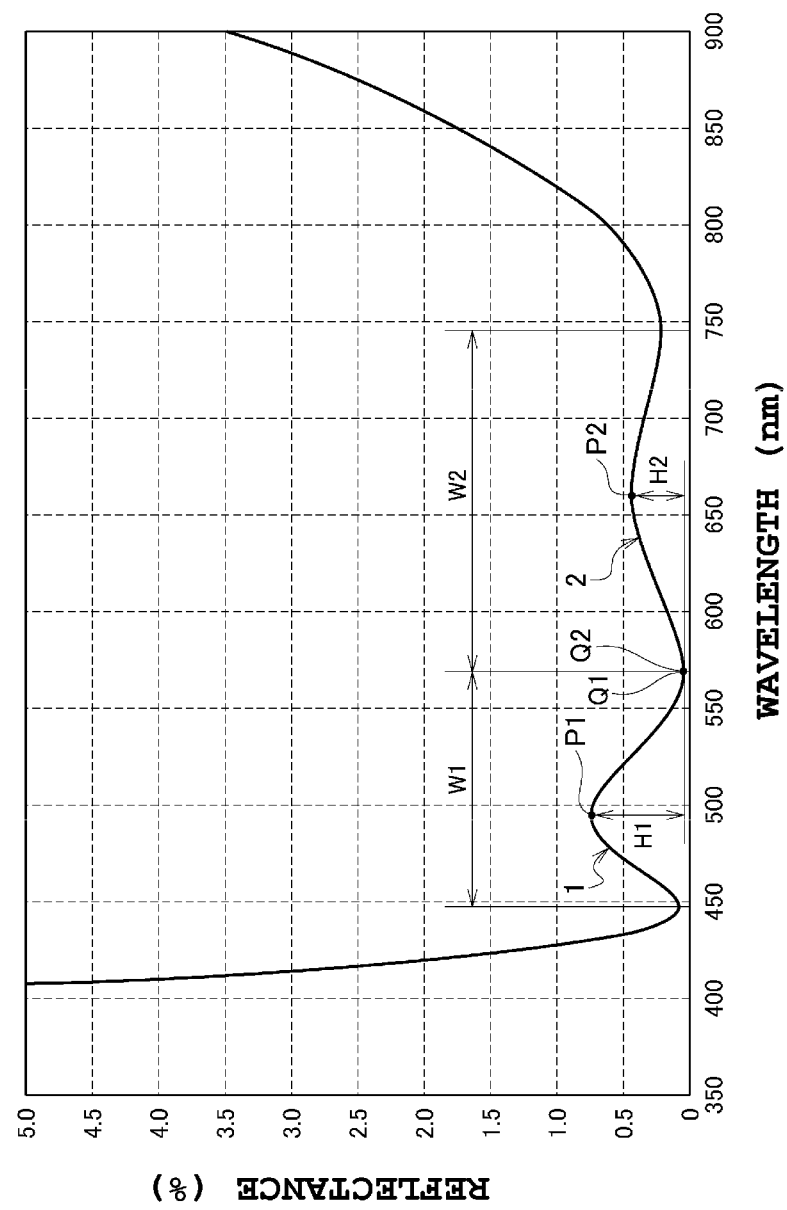
FIG. 1 is a view showing a spectral reflectance property of an antireflection film according to an embodiment of the present invention.

Detailed description of the present invention will be described hereafter, with reference to the drawings.

First, explanation is given for a technical concept on which the present invention is based.

A design concept of an antireflection film in the related art is as follows: a reflection of a light beam is uniformly suppressed to be low in a visible light region. Further, an antireflection effect of a light by the antireflection film is obtained in such a way that a light reflected by a surface of the antireflection film and a light reflected by a rear surface of the antireflection film are interfered each other, thereby canceling wavelengths of mutual lights. At this time, a wavelength band in which the antireflection effect can be obtained, is varied depending on a parameter such as a constitutional material, a refractive index, and a film thickness, etc., of the antireflection film. Therefore, when the antireflection film is formed into a multilayer film, reflection of a light beam can be suppressed to be low in a wider wavelength region. Therefore, according to a conventional design concept, the antireflection film is formed into a multilayer film, to thereby obtain a desired antireflection property.

However, a result of an experiment by inventors of the present invention reveals a phenomenon that a generation of a ghost in an imaging optical system cannot be effectively reduced, even if using the antireflection film capable of suppressing the reflection of the light beam to be low in the visible light region based on the conventional design concept. More specifically, in the imaging optical system using the concave meniscus lens as the first lens, the antireflection film having the same property is formed over the concave meniscus lens with a concave surface formed into a spherical surface, and over the concave meniscus lens with a concave surface formed into an aspherical surface based on the conventional design concept, and a generation state of the ghost in the imaging optical system is confirmed. An evaluation of the ghost includes a case that the ghost is evaluated by optical data (luminance data, etc.) and a case that the ghost is evaluated by visually evaluating a picked-up image. The inventors of the present invention evaluate the ghost visually. As a result, in a case of using the concave meniscus lens with the concave surface formed into the spherical surface, the generation of the ghost is sufficiently suppressed, even if the incident angle of the light beam incident on the optical surface of the lens is varied. Meanwhile, in a case of using the concave meniscus lens with the concave surface formed into the aspherical surface, the following phenomenon is recognized: the generation of the ghost is remarkable when the incident angle of the light beam is in a specific range (30° to 70°).

In view of the above-described circumstance, the inventors of the present invention achieve the optical property of the antireflection film which is effective for reducing the ghost, not simply based on the conventional design concept of uniformly suppressing the reflection of the light beam to be low in the visible light region, but in consideration of a color balance of the ghost actually generated in the imaging optical system. Explanation will be given hereafter.

First, a main technical concept of the present invention is as follows. The antireflection film is formed on the optical surface of the optical member, and is configured to prevent the reflection of the light beam incident on this optical surface. As a spectral reflectance property in a case that the light beam is incident on the optical surface at an incident angle of 0 degree, a maximum reflectance P1 in a first wavelength region and a maximum reflectance P2 in a second wavelength region at a wavelength side longer than the first wavelength region, satisfy a relation of P1>P2, and by shifting a wavelength range where the reflectance is a specific value or less, to a wavelength side longer than the second wavelength region, the reflectance in the second wavelength region is decreased, and the reflectance in the first wavelength region is increased so that a luminance difference is small between a ghost in the first wavelength region and a ghost in the second wavelength region. The first wavelength region is a wavelength region in a wavelength range of 450 nm or more and less than 550 nm, corresponding to a wavelength range of yellow color to red color, if expressed by a color of a light. The second wavelength region is a wavelength region in a wavelength range of 600 nm or more and less than 750 nm, corresponding to a wavelength region of blue color to green color, if expressed by the color of the light.

The luminance difference between ghosts means the difference in luminance in each color of the light (called "ghost light" hereafter) being a generation factor of the ghost. In a case of a high luminance in a wavelength range of yellow color to red color, particularly red color, out of a color component of the ghost light, a color difference between an actual image and the ghost appears remarkable in an actually picked-up image, and the ghost becomes conspicuous. Therefore, according to the present invention, the reflectance is decreased in the wavelength region of yellow color to red color in which the ghost is conspicuous, and the reflectance in the wavelength region of blue color to green color is increased so that the luminance difference is small between a ghost in the wavelength region of yellow color to red color, and a ghost in the wavelength region of blue color to green color (preferably so that the luminance difference can be canceled each other), to thereby reduce the ghost. A degree of increasing the reflectance in the wavelength region of blue color to green color may be determined by how much the luminance difference between the ghosts remained in an image at this time should be small, or how much difference is observed between the blue color and the red color.

Further, according to the present invention, as the spectral reflectance property in a case of a light beam incident on the optical surface at the incident angle of 0 degree, the reflectance in the wavelength region of yellow color to red color is decreased by the shift of the wavelength range where the reflectance is a specific value or less, to the wavelength side longer than the wavelength region of yellow color to red color.

Further, according to the present invention, as the spectral reflectance property in a case of the light beam incident on the optical surface at the incident angle of 0 degree, the reflectance in the wavelength region of blue color to green color is increased, so that the reflectance R1 at the wavelength side shorter than the wavelength region of yellow color, and the reflectance R2 at the wavelength side longer than the wavelength region of yellow color, satisfy a relation of $R1 \geq R2$.

The "incident angle" descried here means an angle formed by the light beam incident on the optical surface, with respect to an axis vertical to the optical surface. Therefore, when the optical surface is the surface of the lens, the angel formed by the optical axis of the lens and the light beam incident on the surface of the lens, is the incident angle.

According to the antireflection film having the above-mentioned optical property, the luminance of the ghost can be suppressed to be low in the wavelength region of yellow color to red color, by reducing the reflectance in the wavelength region of yellow color to red color. In addition, a color balance of the ghost is corrected in which red color is originally conspicuous, by increasing the reflectance in the wavelength region of blue color to green color. More specifically, the ghost in the wavelength region of yellow color to red color (a second region) is canceled by the ghost in the wavelength region of blue color to green color (a first region). Therefore, the ghost (particularly the ghost of red color) can be set in an inconspicuous state. The first region at the short wavelength side relatively, and the second region at the long wavelength side relatively, are divided with a wavelength on a boundary between a wavelength band of yellow color and a wavelength band of green color as a reference.

(Optical Property of the Antireflection Film)

The optical property of the antireflection film based on the technical concept of the present invention will be described hereafter.

FIG. 1 is a view showing the spectral reflectance property of the antireflection film according to an embodiment of the present invention. In FIG. 1, regarding the antireflection film formed on the optical surface of the optical member, the spectral reflectance property in a case of the light beam incident on the optical surface at the incident angle of 0 degree, is shown by a solid line curve, in which the reflectance (%) of the light taken on the vertical axis, and the wavelength (nm) taken on the horizontal axis.

Further, a designation mark in the figure shows following matters:
W1: Wavelength width of the first wavelength region
W2: Wavelength width of the second wavelength region
P1: Maximum reflectance in the first wavelength region (W1)
P2: Maximum reflectance in the second wavelength region (W2)
Q1: Minimum reflectance in the first wavelength region (W1)
Q2: Minimum reflectance in the second wavelength region (W2)

H1: Difference between maximum reflectance P1 and minimum reflectance Q1 in the first wavelength region (W1)
H2: Difference between maximum reflectance P2 and minimum reflectance Q2 in the second wavelength region (W2)

W1 as the first wavelength region has a specific wavelength width (50 nm to 200 nm) from a minimum point at a shortest wavelength side to the long wavelength side in the spectral reflectance property. One end (minimum point) at the short wavelength side of W1 is included in a wavelength range of 400 nm to 500 nm. The other end at the long wavelength side of W1 is included in a wavelength range of 500 nm to 600 nm.

W2 as the second wavelength region has a specific wavelength width (50 nm to 200 nm) from one end at the short wavelength side to the long wavelength side of W2. One end at the short wavelength side of W2 is the same as the other end at the long wavelength side of W1. Therefore, one end at the short wavelength side of W2 is included in a wavelength range of 500 nm to 600 nm. The other end at the long wavelength side of W2 is included in a wavelength range of 550 nm to 750 nm.

As described above, one end at the short wavelength side of the first wavelength region (W1) is set in a wavelength range of 400 nm to 500 nm and is determined by the position (wavelength) of the minimum point that exists within this range. Further, the other end at the long wavelength side of the first wavelength region is in a wavelength range of 500 nm to 600 nm, and is determined to be positioned deviated to the long wavelength side by a specific wavelength width W1, from one end at the short wavelength side of the first wavelength region (W1) determined as described above. Meanwhile, the other end at the short wavelength side of the second wavelength region (W2) is determined to be at the same position as the other end of the first wavelength region (W1). Further, an end at the long wavelength side of the second wavelength region is determined to fall within a range of 550 nm to 750 nm, and is determined to be positioned deviated to the long wavelength side by a specific wavelength width W2, from one end at the short wavelength side of the second wavelength region (W2) determined as described above.

Accordingly, the wavelength range of the other end at the long wavelength side of the second wavelength region (W2) is determined as follows: which position (wavelength) is selected as the position of one end at the short wavelength side of the first wavelength region (W1), and in what extent of the wavelength width therefrom, the other end at the long wavelength side of the first wavelength region (W1) and one end at the short wavelength side of the second wavelength region (W2) exist, and whether the other end at the long wavelength side of the second wavelength region (W2) exists in a specific wavelength width therefrom. Therefore, if one end at the short wavelength side of the first wavelength region (W1) exists at 400 nm, and the wavelength width of W1 exists at 200 nm, and the wavelength width of W2 exists at 200 nm, the other end at the long wavelength side of the second wavelength region (W2) exists at 750 nm because the above-mentioned wavelength range is limited. In addition, if one end at the short wavelength side of the first wavelength region (W1) exists at 450 nm, and the wavelength width of W1 is 50 nm, and the wavelength width of W2 is 100 nm, the other end at the long wavelength side of the second wavelength region (W2) exists at 600 nm.

(Shift to the long wavelength side)

In the spectral reflectance property of the antireflection film shown in the figure, the wavelength range in which the reflectance is a prescribed value or less, is shifted to the wavelength side longer than the wavelength region of red color. As an example, when a prescribed value is set to 1.0%, the wavelength range in which the reflectance is 1.0% or less, is a range of approximately 430 nm to 820 nm. In this case, a center wavelength of the wavelength range in which the reflectance is 1.0% or less, is about 625 nm. Meanwhile, when the visible light region is set to 400 nm to 700 nm, the center wavelength of the wavelength range in which the reflectance is 1.0% or less, is shifted to the wavelength side longer than a center wavelength of the visible light region, and is specifically shifted from the center wavelength of the visible light region by beyond 50 nm and about 75 nm. Therefore, the whole characteristic curved line of the spectral reflectance property is shifted to the long wavelength side, when viewing the visible light region as a center. Then, the reflectance in the range extending to the wavelength 820 nm (extending to 780 nm) at the wavelength side longer than the wavelength region of red color, is suppressed to 1.0% or less. Namely, the wavelength region in which the reflectance is 1.0% or less, is expanded to the long wavelength side exceeding the wavelength region of red color.

(A Relative Relation of the Reflectance Between the Short Wavelength Side and the Long Wavelength Side)

The reflectance R1 at the wavelength side shorter than the wavelength region of yellow color, and the reflectance R2 at the wavelength side longer than the wavelength region of yellow color, satisfy a relation of R1≥R2. The reflectance R1 at the short wavelength side corresponds to a maximum reflectance in the first wavelength region defined by the wavelength width W1, and the reflectance R2 at the long wavelength side corresponds to a maximum reflectance at the second wavelength region defined by the wavelength width W2. The maximum reflectance P1 exists in a range of the wavelength 450 nm or more and less than 550 nm. The maximum reflectance P2 exists in a range of the wavelength 600 nm or more and less than 750 nm. A position where the reflectance is maximum may be set as the "maximum reflectance P1" in the wavelength range of 450 nm or more and less than 550 nm. When a plurality of maximum values exist in the range of the wavelength 450 nm or more and less than 550 nm, a maximum value in the wavelength range where the reflectance is higher, may be set as the "maximum reflectance P1". Similarly, a position where the reflectance is maximum may be set as the "maximum reflectance P2" in a range of the wavelength 600 nm or more and less than 750 nm. When a plurality of maximum values exist in the range of the wavelength 600 nm or more and less than 750 nm, the maximum value in the wavelength range where the reflectance is higher, may be set as the "maximum reflectance P2".

The maximum reflectance P1 preferably exists in a wavelength range of 450 nm or more and less than 550 nm, and further preferably exists in a wavelength range of 470 nm or more and less than 530 nm. In this embodiment, the maximum reflectance P1 exists in the vicinity of the wavelength 500 nm. The wavelength 500 nm is the wavelength corresponding to a boundary between blue color and green color, when viewed by a color component of light for each wavelength. The maximum reflectance P2 exits in the vicinity of the wavelength 650 nm in a wavelength range of 600 nm or more and less than 750 nm. The wavelength 650 nm is the wavelength corresponding to an intermediate portion of a wavelength band of a red color component, when viewed by the color component of the light for each wavelength.

The maximum reflectance P1 is preferably set to 0.5% or more and 3.0% or less, 0.5% or more and 2.5% or less for example, and preferably set to 0.5% or more and 2.0% or less, and further preferably set to 0.6% or more and 1.5% or less, and further preferably set to 0.6% or more and 1.0% or less. In this embodiment, the maximum reflectance P1 is about 0.75%. The maximum reflectance P2 is preferably set to 2.5% or less, preferably 1.5% or less, further preferably set to 1.0% or less, and further preferably set to 0.5% or less, provided that the above-mentioned relation of R1≥R2 is satisfied. In this embodiment, the reflectance at a maximum point P2 is about 0.45%. The reflectance R1 at a maximum point P1 is the maximum reflectance in a wavelength range of 450 nm or more and less than 550 nm, and the reflectance R2 at a maximum point P2 is the maximum reflectance in a wavelength range of 600 nm or more and less than 750 nm.

In the characteristic curved line showing the spectral reflectance property of the antireflection film, the maximum reflectance means the reflectance corresponding to a top of a waveform distributed in a mountain-shape in such a manner as protruding upward. The number of tops of the waveform is determined by the number of layers of the antireflection film. A three-layer structure of the antireflection film is taken as an example in this embodiment. Therefore, the number of tops is two. Further, in the specification of the present invention, the waveform distributed in a mountain-shape passing through the top of the waveform, is defined as a "peak waveform", and based on this definition, the waveform distributed in a mountain-shape passing through the top at the maximum reflectance P1 is defined as a peak waveform 1, and the waveform distributed in a mountain-shape passing through the top at the maximum reflectance P2 is defined as a peak waveform 2. The peak waveform 1 exists in a first wavelength region (W1) at the short wavelength side, and the peak waveform 2 exists in a second waveform region (W2) at the long wavelength side. Preferably the peak wavelength 1 has a symmetric shape with the top at the maximum reflectance P1 as approximately a center. The same thing can be said for the peak wavelength 2. A distribution width of the peak wavelength is obtained by a wavelength conversion applied to a width from a bottom portion of one of the peak wavelength (the short wavelength side) to a bottom portion of the other peak wavelength (the long wavelength side), and a height of the peak wavelength is obtained by a reflectance conversion applied to a height difference between the top of the peak wavelength and the bottom portion. Regarding the bottom portion used for obtaining the height of the peak wavelength, the bottom portion with relatively low reflectance is used.

The first wavelength region W1 is preferably set in a range of the wavelength 50 nm or more and less than 200 nm, and preferably in a range of the wavelength 100 nm or more and less than 150 nm, by wavelength conversion. The second wavelength region W2 is larger than the first wavelength region W1. Specifically, W2 is about 180 nm by wavelength conversion.

A reflectance difference H1 shown by (P1−Q1) is set to 0.3% or more, and preferably set to 0.5% or more by reflectance conversion. In this embodiment, the reflectance difference H1 is about 0.7% by reflectance conversion. Also, a reflectance difference H2 shown by (P2−Q2) is lower than the reflectance difference H1. Specifically, the reflectance difference H2 is about 0.4% by reflectance conversion.

In the spectral reflectance property of the antireflection film, the reflectance in the wavelength region of yellow color to red color is decreased by shifting the wavelength range where the reflectance is a specific value or less, to the wavelength side longer than the wavelength region of red color. Therefore, the ghost in the wavelength region of yellow color to red color can be reduced. In the spectral reflectance property of the antireflection film, the reflectance at the wavelength side shorter than the wavelength region of yellow color is set to not less than the reflectance at the long wavelength side, to thereby relatively increase the reflectance at the wavelength region of blue color to green color. Therefore, the ghost in the wavelength region of yellow color to red color can be canceled by the ghost in the wavelength region of blue color to green color.

Further, when a luminance difference is small between the ghosts by reducing the reflectance in the wavelength region of yellow color to red color and increasing the reflectance in the wavelength region of blue color to green color, a deviation in a color balance of the ghost is solved. Therefore, the ghost of yellow color to red color (particularly red color) which is likely to be conspicuous as the ghost, can be reduced significantly.

Further, the antireflection film according to this embodiment shown in FIG. 1 has the spectral reflectance property including the above-mentioned peak wavelength 1, and is configured to cancel the ghost by utilizing a light beam of a color component in which the reflectance becomes high based on the peak wavelength 1. Therefore, if compared with a conventional antireflection film which is multi-layered for uniformly suppressing the reflectance to be low in the visible light region, the ghost can be effectively reduced by a smaller number of layers than the conventional antireflection film. If compared with the antireflection film of the same number of layers, a high ghost reducing effect can be obtained, which is higher than the antireflection film based on a design concept of simply suppressing the reflectance to be low in the visible light region. Further, as the spectral reflectance property of the antireflection film 12, the peak wavelength 1 having the maximum reflectance P1 is included in a wavelength range of 450 nm or more and less than 550 nm. Therefore, the ghost of the yellow color to red color component (particularly a red color component) which is likely to be conspicuous in an imaging optical system, can be effectively reduced. At this time, although the reflectance in the wavelength region of blue color to green color is increased by an existence of the maximum reflectance P1, it is sufficient to increase the reflectance in such a manner as making the luminance difference small between the ghost in the wavelength region of yellow color to red color, and the ghost in the wavelength region of blue color to green color, and in such a manner as canceling the ghost each other preferably.

Figure 2:
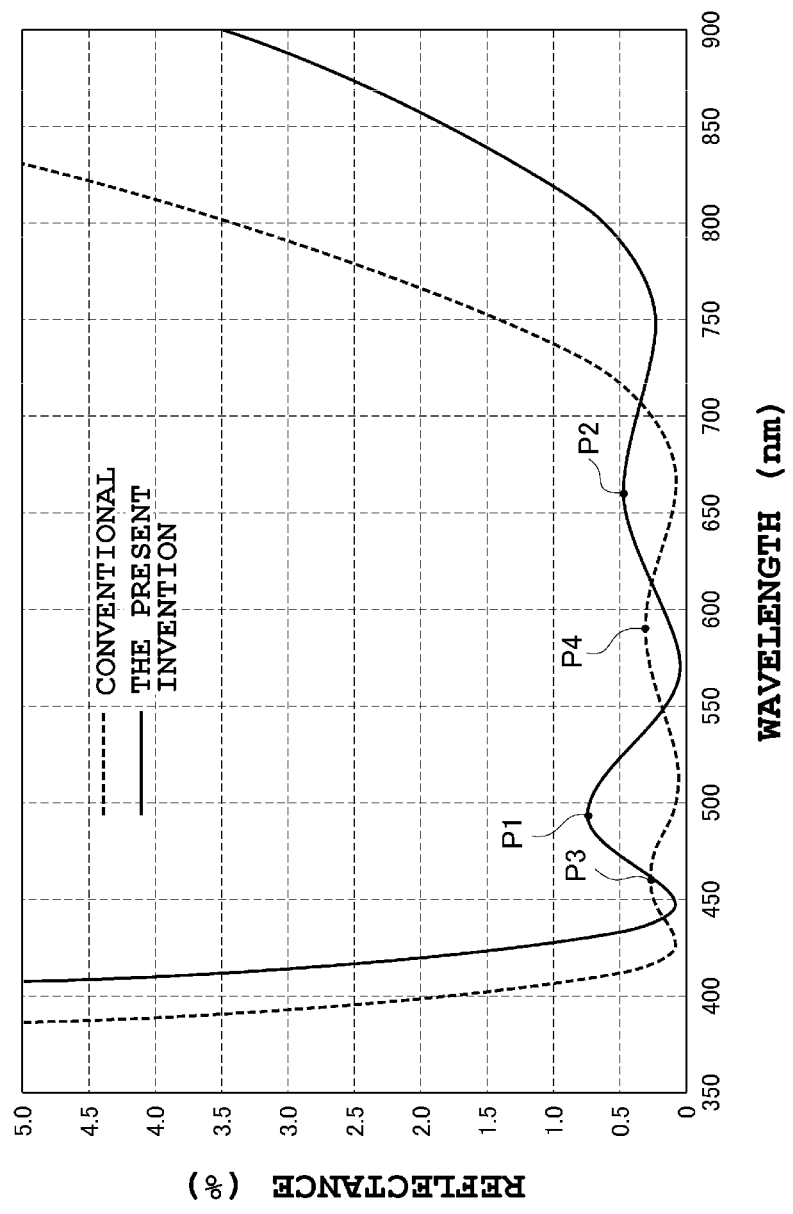
FIG. 2 is a view comparing the spectral reflectance property of a conventional antireflection film, and the spectral reflectance property of the antireflection film according to an embodiment of the present invention.

FIG. 2 shows the spectral reflectance property of the conventional antireflection film and the spectral reflectance property of the antireflection film according to an embodiment of the present invention, for comparison. In FIG. 2, the spectral reflectance property of the conventional antireflection film is shown by a dot line, and the spectral reflectance property of the antireflection film according to an embodiment of the present invention is shown by a solid line. As is clarified from the figure, in the spectral reflectance property of the conventional antireflection film, a maximum reflectance P3 exists in a range of the wavelength 400 nm or more and less than 500 nm, and a maximum reflectance P4 exists in a range of the wavelength 500 nm or more and less than 660 nm. However, the reflectance at a maximum point P3 is lower than 0.5%. Also, the reflectance at a maximum point p3 is lower than the reflectance at a maximum point P4. Further, a center wavelength (570 nm) in the wavelength range (405 nm to 735 nm) where the reflectance is 1.0% or less, is positioned in the vicinity of the center wavelength of the visible light region. Note that the reflectance is suddenly increased from the wavelengths 700 nm to 800 nm, and the reflectance at the wavelength of 800 nm is about 3.5 and high. Meanwhile, in the spectral reflectance property of the antireflection film according to an embodiment of the present invention, there is a unique zone showing a high reflectance in the wavelength range of 450 nm to 550 nm. Further, in the spectral reflectance property of the antireflection film of the present invention, the wavelength region in which the reflectance is suppressed to 1.0% or less, is shifted to the long wavelength side, and its wavelength range is wide.

Figure 3:
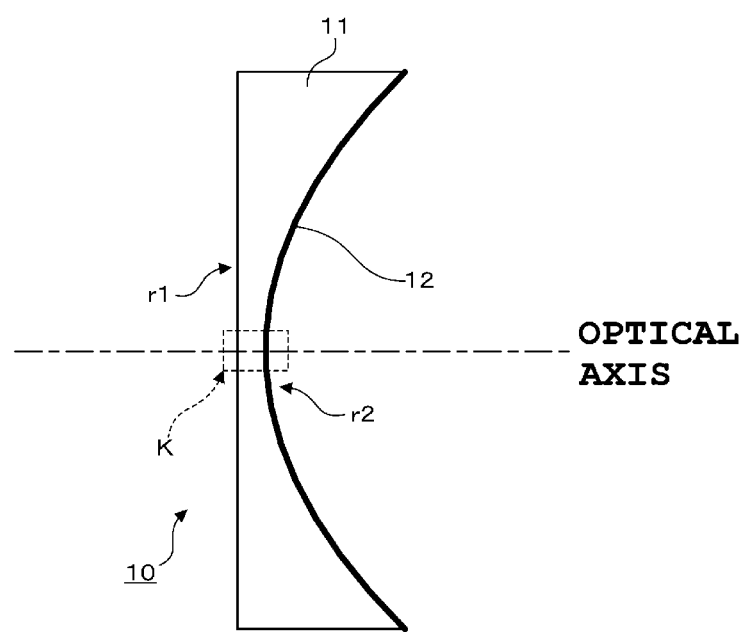
FIG. 3 is a cross-sectional view showing a constitutional example of an optical element according to an embodiment of the present invention.
Figure 4:
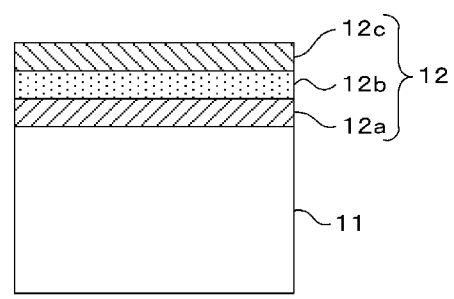
FIG. 4 is an expanded view of a K portion (a portion in the vicinity of an optical axis) of FIG. 3.

FIG. 3 is a cross-sectional view showing a constitutional example of an optical element according to an embodiment of the present invention, and FIG. 4 is an expanded view of a K-portion (a portion near an optical axis) of FIG. 3.

An optical element 10 shown in the figure is configured so that a concave meniscus lens 11 is used as an example of an optical member. The concave meniscus lens 11 is formed integrally with an optical glass as a lens base material, the optical glass having a high refractive index (a refractive index nd may be 1.50 or more, and preferably may be 1.70 or more, and further preferably may be 1.85 or more). The concave meniscus lens 11 has a first surface r1 and a second surface r2 being an optical surface respectively. The first surface r1 is approximately a flat surface. However, the first surface r1 may be an aspherical convex surface slightly more protruded than a flat state, or an aspherical concave surface slightly more depressed than a flat state. The second surface r2 is a concave surface largely depressed from a flat state, and more specifically is formed into an aspherical concave surface. In this case, a maximum surface angle can be set to 40 to 70°, and is set to 43° in an example described below.

An antireflection film 12 is formed on the second surface r2 (aspherical surface shape) of the concave meniscus lens 11.

The antireflection film 12 is the film having the spectral reflectance property shown in FIG. 1. In this case, the spectral reflectance property is obtained when a light beam is incident on the optical center of the concave meniscus lens 11 at an incident angle of 0 degree. The antireflection film 12 has a three-layer structure composed of a first layer 12a, a second layer 12b, and a third layer 12c. Each layer is laminated sequentially from the first layer 12a (the first layer having a first refractive index), the second layer 12b (the second layer having a second refractive index), and the third layer 12c (the third layer having a third refractive index), from a side close to the second surface r2 of the concave meniscus lens 11. Each layer is formed, using a constitutional material different from each other.

A basic film structure of the antireflection film according to an embodiment of the present invention is a structure sequentially laminating xM, yH, and zL, toward an air side (outside) from the lens base material side, provided that the structure is the above-mentioned three-layer structure. M, H, L means the refractive index of a thin film material respectively, and M can be 1.55 or more and less than 1.80 (first refractive index), and H can be 1.80 or more and 2.60 or less (second refractive index), and L can be 1.30 or more and less than 1.55 (third refractive index), which can be set so that values of M, H, L are not overlapped on each other. Further, x, y, z means an optical film thickness respectively, and can be expressed as Sub/xM/yH/zL/Air. The optical film thickness is expressed by nd=k/4×$\lambda_0$, wherein k is an optical film thickness coefficient. Here, $\lambda_0$=550 nm. The following numerical value range can be applied to the numerical values of x, y, z.

x=0.70 to 2.40
y=0.70 to 2.40
z=0.70 to 1.30

Further, the antireflection film according to an embodiment of the present invention can be replaced by an equivalent film. A layer structure of the antireflection film is not limited to three layers, and the first layer having the first refractive index M can be replaced by the equivalent film composed of a plurality of layers. The equivalent film equivalent to the first refractive index M has a property equivalent to the property of the first layer, and as described later, 4 to 7 layers can be used. As a film material of each layer, aluminum oxide, zirconium oxide, titanium oxide, silicon oxide, niobium oxide, tantalum oxide, and magnesium fluoride, etc., can be used. For example, zirconium oxide and tantalum oxide are mixed at a specific ratio, and can be used as a film material of the first layer. More preferably, explanation is given as follows. In the explanation given below, the refractive index of Air is assumed to be 1.0000.

TABLE 1

| Refractive index | Constitutional material | Substrate temperature | Vacuum degree after introducing oxygen | Film deposition rate |
|---|---|---|---|---|
| M | Material containing any one of aluminum oxide, zirconium oxide, silicon oxide | Non-heating to 350° | Non-introduction of oxygen or in a range of 5.0 × 10$^{-4}$ (Pa) to 3.5 × 10$^{-2}$ (Pa) | 0.1~5.0 nm/sec |
| H | Material containing any one of aluminum oxide, zirconium oxide, titanium oxide, niobium oxide, tantalum oxide | | | |
| L | Material containing either magnesium fluoride or silicon oxide | | | |

The above-mentioned table 1 is applied to all examples and modified examples described below.

FIG. 5 shows a specific first example of the antireflection film (film structure: Sub/xM/yH/zL/Air). In FIG. 5, the refractive index of the light is expressed by "n" when a standard wavelength $\lambda^0$ is 550 nm. Further, regarding the film thickness of each layer, film thickness "d" and the optical film thickness are described side by side. The optical film thickness is expressed by a formula "nd=k/4×$\lambda_0$". k means the optical film thickness coefficient. First, the constitutional material is described. An optical glass by HOYA Corporation (glass type: M-TAF101) is used as the base material of the concave meniscus lens 11. In each layer constituting the antireflection film, the first layer 12a is made of aluminum oxide ($Al_2O_3$), and the second layer 12b is made of an optical film material by Canon optron Inc., (product name: OH-5 (a mixed film of zirconium and titanium oxide ($ZrO_2$+$TiO_2$)), and the third layer 12c is made of magnesium fluoride ($MgF_2$). Further, the ratio of a mixed material constituting the second layer is $ZrO_2$:$TiO_2$=9:1. FIG. 5 shows the film structure of each layer.

(Method of Manufacturing the Antireflection Film)

The antireflection film with the above-mentioned structure can be formed by utilizing a publicly-known film forming method. For example, a physical vapor deposition such as a vacuum vapor deposition, ion assist vapor deposition, ion plating, sputtering, and ion beam sputtering; a chemical vapor deposition such as a thermal CVD (Chemical Vapor Deposition), plasma CVD, and optical CVD; and a Sol-gel method., etc., can be used. Inventors of the present invention achieve a formation of the antireflection film by the vacuum vapor deposition. A specific forming condition is described hereafter.

The first layer: forming condition of an $Al_2O_3$ film
The first layer is formed once.
    Substrate heating temperature: about 260° C. (a range of 250° C. to 270° C. is acceptable)
    Vacuum degree during film formation after introducing oxygen: $7.2 \times 10^{-3}$ Pa (a range of 7.1 to $7.3 \times 10^{-3}$ Pa is acceptable)
    Deposition rate: about 0.8 nm/sec
The second layer: forming condition of a $ZrO_2+TiO_2$ mixed film
The film formation of the second layer is performed once.
    Substrate heating: about 260° C. (A range of 250° C. to 270° C. is acceptable)
    Vacuum degree during film formation after introducing oxygen: $8.5 \times 10^{-3}$ Pa (a range of 8.4 to $8.6 \times 10^{-3}$ Pa is acceptable)
    Deposition rate: about 0.8 nm/sec
The third layer: forming condition of a $MgF_2$ film
The third layer is formed once.
    Substrate heating: about 260° C. (a range of 250° C. to 270° C. is acceptable)
    Oxygen introduction: Non
    Deposition rate: about 1.0 nm/sec Modified Example 1 of the First Example As a modified example 1 of the above-mentioned example, FIG. 6 shows a film structure of the three-layer antireflection film formed by performing film formation of the first layer and the second layer twice, and the method of forming this antireflection film will be described hereafter. By forming a relatively thick film by performing film formation twice, uniformity of a film quality (such as refractive index and film density, etc.) in a film thickness direction can be improved, and controllability of the film thickness during deposition can be improved. Therefore, a film having a desired film design value (optical film thickness) can be stably formed.

The first layer: forming condition of the $Al_2O_3$ film
The film formation of the first layer is performed twice, to thereby equalize the film structure.
(First Film Formation)
    Substrate heating: about 260° C.
    Vacuum degree during film formation after introducing oxygen: $7.2 \times 10^{-3}$ Pa
    Deposition rate: about 0.5 nm/sec
(Second Film Formation)
    Substrate heating: about 260° C.
    Vacuum degree during film formation after introducing oxygen: $7.2 \times 10^{-3}$ Pa
    Deposition rate: about 0.8 nm/sec
The second layer: Forming condition of the $ZrO_2+TiO_2$ mixed film
The film formation of the second layer is performed twice, to thereby equalize the film structure.

Figure 7:
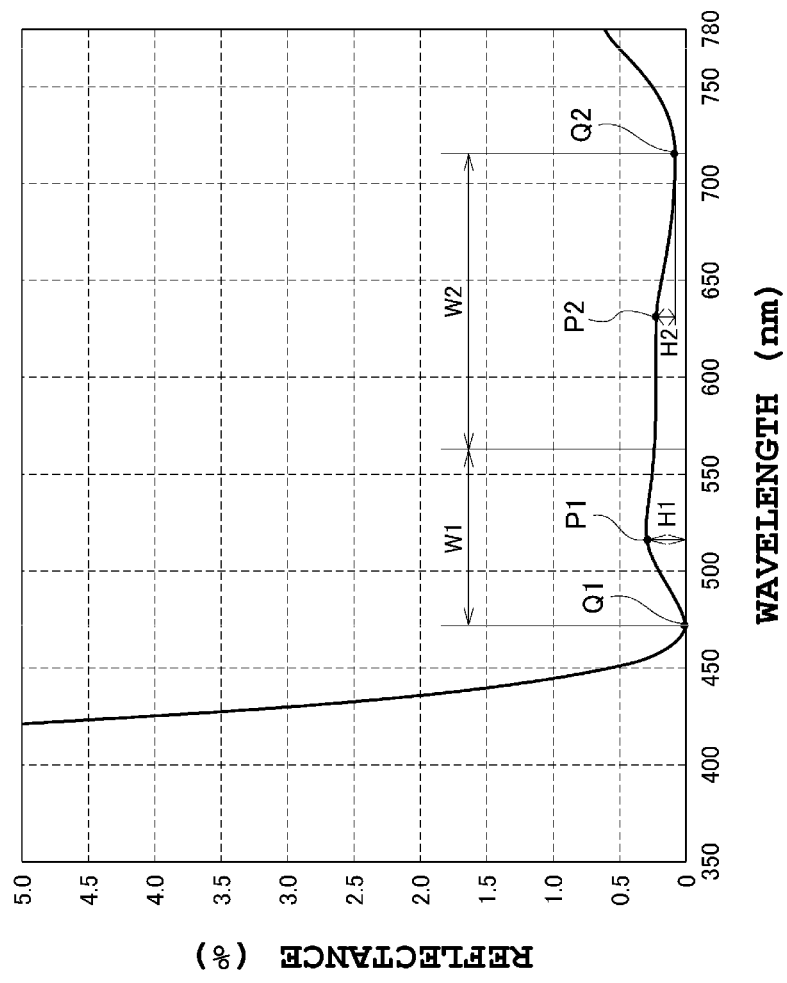
FIG. 7 is a view showing the spectral reflectance property of the antireflection film according to the first example and the modified example 1 of the first example.

(First Film Formation)
    Substrate heating: about 260° C.
    Vacuum degree during film formation after introducing oxygen: $8.5 \times 10^{-3}$ Pa (a range of 8.4 to $8.6 \times 10^{-3}$ Pa is acceptable)
    Deposition rate: about 0.8 nm/sec
(Second Film Formation)
    Substrate heating: about 260° C.
    Vacuum degree during film formation after introducing oxygen: $8.5 \times 10^{-3}$ Pa (a range of 8.4 to $8.6 \times 10^{-3}$ Pa is acceptable)
    Deposition rate: about 0.8 nm/sec
The third layer: forming condition of the $MgF_2$ film
The film formation of the third layer is performed once.
    Substrate heating: about 260° C.
    Introduction of oxygen: about 260° C.
    Deposition rate: about 1.0 nm/sec FIG. 7 shows the spectral reflection property of the antireflection film according to the first example and the modified example 1. In the spectral reflection property shown in the figure, the wavelength at the maximum reflectance P1 is about 520 nm, the wavelength at the maximum reflectance P2 is about 630 nm, the wavelength width W1 is about 90 nm, the wavelength width W2 is about 150 nm, the reflectance difference H1 is about 0.3%, and the reflectance difference H2 is about 0.2%.

Modified Example 2 of the First Example

In addition, as a modified example 2 of the first example, FIG. 8 shows the film structure of the three-layer antireflection film formed by performing film formation of the first layer and the second layer of the first example twice, while providing a difference in the film structure between the first film formation and the second film formation, and performing a fine adjustment of the optical property. The method of forming this antireflection film is described hereafter. In the modified example 2, the film formation is performed by performing film formation of the first layer and the second layer twice, while providing a difference in the film structure between the first layer and the second layer. The difference is provided in the film structure because in the same constitutional material, when the film quality is varied in a film thickness direction, such a variation in the film quality in the film thickness direction can be canceled by providing the difference in the film forming condition, to thereby stably form a film having a desired film design value (optical film thickness). Namely, an abnormal particle growth during vapor deposition can be suppressed, and an optical film with uniform film quality and small light scattering can be formed.

The first layer: forming condition of the $Al_2O_3$ film
The film formation of the first layer is performed twice.
(First film formation)
    Substrate heating: about 260° C.
    Vacuum degree during film formation after introducing oxygen: $7.2 \times 10^{-3}$ Pa
    Deposition rate: about 0.5 nm/sec
(Second Film Formation)
    Substrate heating: about 260° C.
    Vacuum degree during film formation after introducing oxygen: $7.2 \times 10^{-3}$ Pa
    Deposition rate: about 0.8 nm/sec
The second layer: forming condition of the $ZrO_2+TiO_2$ mixed film
The film formation of the second layer is performed twice.

(First Film Formation)
   Substrate heating: about 260° C.
   Vacuum degree during film formation after introducing oxygen: 8.45×10$^{-3}$ Pa (a range of 8.4 to 8.5×10$^{-3}$ Pa is acceptable)
   Deposition rate: about 0.8 nm/sec
(Second Film Formation)
   Substrate heating: about 260° C.
   Vacuum degree during film formation after introducing oxygen: 8.45×10$^{-3}$ Pa (a range of 8.4 to 8.5×10$^{-3}$ Pa is acceptable)
   Deposition rate: about 0.8 nm/sec
The third layer: forming condition of the MgF$_2$ film
The film formation of the third layer is performed once.
   Substrate heating: about 260° C.
   Oxygen introduction: Non
   Deposition rate: about 1.0 nm/sec Here, as described in the above-mentioned modified example 2, when the first layer 12a of the antireflection film 12 of the concave meniscus lens is formed, the film formation is performed twice using the same constitutional material. Therefore, the optical property can be finely adjusted by providing the difference in an optical film thickness coefficient k or the refractive index n, between the first film formation and the second film formation, when a desired optical property cannot be obtained due to a variation of the film quality. This point can also apply to a case that the second layer 12b and the third layer 12c are formed. Further, not only in a case that a desired optical property cannot be obtained, but also in a case that a desired optical property can be obtained, the film formation may be performed twice or more.

Figure 9:
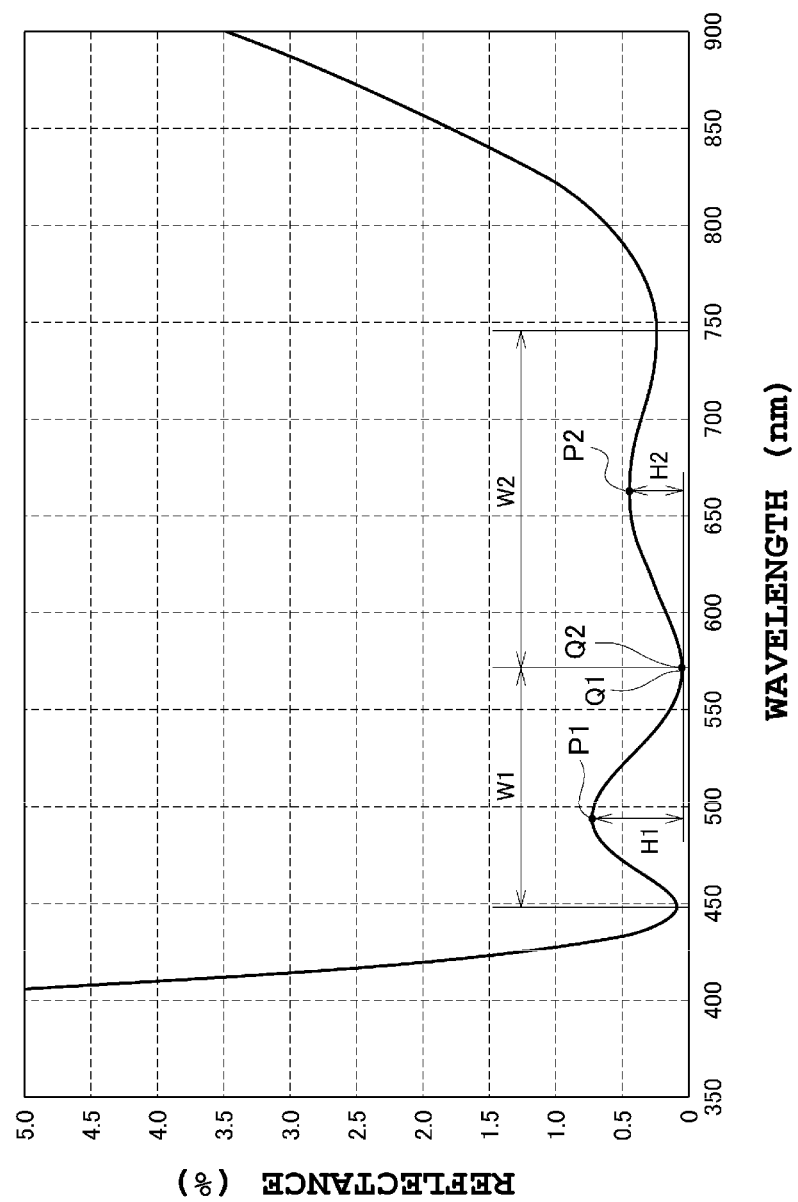
FIG. 9 is a view showing the spectral reflectance property of the antireflection film according to a modified example 2 of the first example.

FIG. 9 is a view showing the spectral reflection property of the antireflection film according to a modified example 2 of the first example. In the spectral reflection property shown in the figure, the wavelength at the maximum reflectance P1 is about 490 nm, the wavelength at the maximum reflectance P2 is about 665 nm, the wavelength width W1 is about 125 nm, the wavelength width W2 is about 170 nm, the reflectance difference H1 is about 0.75, and the reflectance difference H2 is about 0.4%.

Regarding the three-layer antireflection film, explanation is given for an example of forming each layer by performing film formation once or twice. Explanation is given for the present invention hereafter while showing an example of four-layer to seven-layer antireflection film obtained by forming one layer by performing film formation once. Although an example of forming one layer by performing film formation once is shown, the present invention is not limited thereto, and an arbitrary one layer may be formed by performing film formation of an arbitrary one layer twice or three times or more.

Second Example

Figure 11:
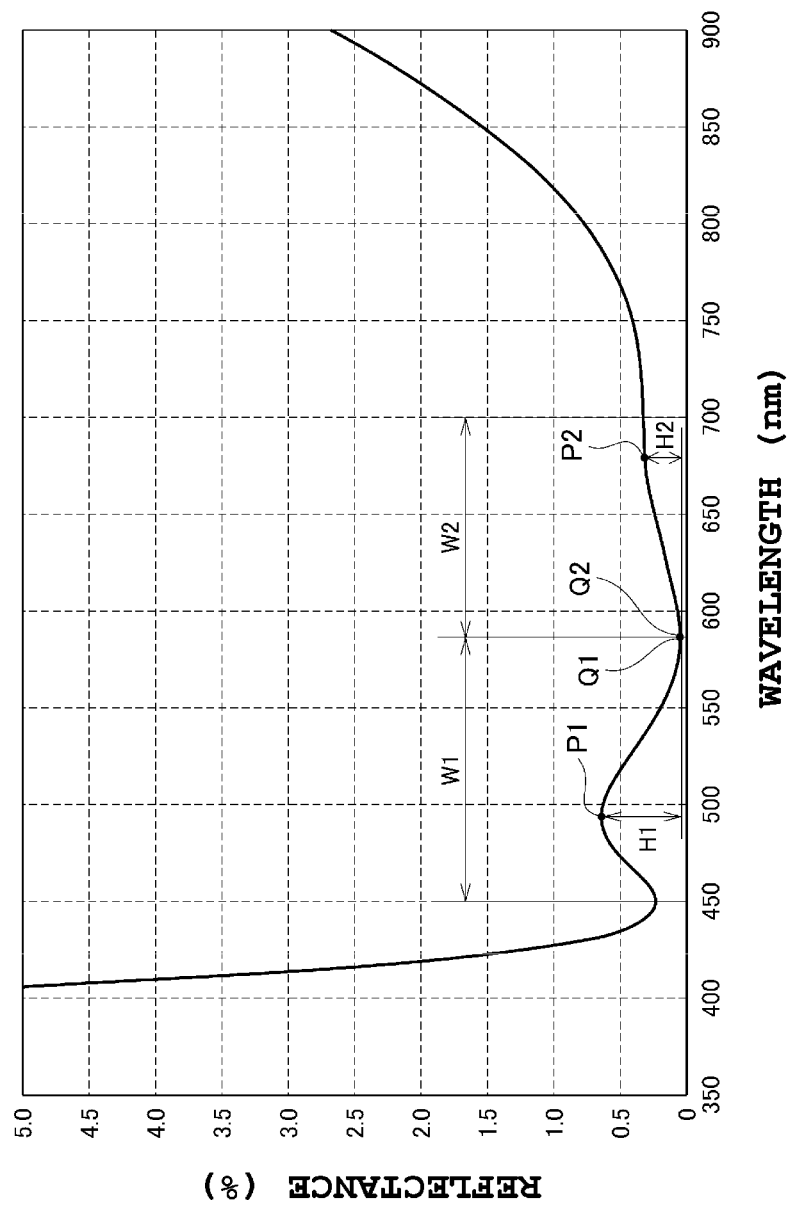
FIG. 11 is a view showing the spectral reflectance property of the antireflection film according to the second example.

FIG. 10 shows a specific second example of the antireflection film (four-layer film structure: Sub/x$_1$L/x$_2$M/yH/zL/Air). First, the constitutional material is as follows: the optical glass by HOYA Corporation (glass type: M-BACD12) is used for the base material of the concave meniscus lens 11. Further, In each layer constituting the antireflection film, the first layer 12a is made of aluminum oxide (Al$_2$O$_3$), and the second layer 12b is made of aluminum oxide (Al$_2$O$_3$), and the third layer 12c is made of an optical film material by Canon optron Inc., (product name: OH-5 (a mixed film of zirconium and titanium oxide (ZrO$_2$+TiO$_2$)), and a fourth layer 12d is made of magnesium fluoride (MgF$_2$). Further, the ratio of a mixed material constituting the third layer is ZrO$_2$:TiO$_2$=9:1. The following numerical range can be applied to the numerical values of x, y, z.
   x1=0.01 to 0.50
   x2=1.00 to 1.60
   y=0.70 to 2.30
   z=0.70 to 1.30
The film structure of each layer is shown in FIG. 10.
(The Method of Manufacturing an Antireflection Film)
The antireflection film with the above-mentioned structure is formed by the vacuum vapor deposition, similarly to the above-mentioned first example. A specific forming condition is described hereafter.
The first layer: forming condition of the MgF$_2$ film
The film formation of the first layer is performed once.
   Substrate heating: about 260° C. (a range of 250° C. to 270° C. is acceptable)
   Introduction of oxygen: none
   Deposition rate: about 1.0 nm/sec
The second layer: forming condition of Al$_2$O$_3$
The film formation of the second layer is performed once.
   Substrate heating: about 260° C. (a range of 250° C. to 270° C. is acceptable)
   Vacuum degree during film formation after introducing oxygen: 7.2×10$^{-3}$ Pa (a range of 7.1 to 7.3×10$^{-3}$ Pa is acceptable)
   Deposition rate: about 0.8 nm/sec
The third layer: forming condition of ZrO$_2$+TiO$_2$ film
The film formation of the third film is performed once.
   Substrate heating: about 260° C. (a range of 250° C. to 270° C. is acceptable)
   Vacuum degree during film formation after introducing oxygen: 8.45×10$^{-3}$ Pa (a range of 8.4 to 8.5×10$^{-3}$ Pa is acceptable)
   Deposition rate: about 0.8 nm/sec
The fourth layer: forming condition of the MgF$_2$ film
   Substrate heating: about 260° C. (a range of 250° C. to 270° C. is acceptable)
   Introduction of oxygen: none
   Deposition rate: about 1.0 nm/sec FIG. 11 is a view showing the spectral reflection property of the antireflection film according to a second example. In the spectral reflection property shown in the figure, the wavelength at the maximum reflectance P1 is about 490 nm, the wavelength at the maximum reflectance P2 is about 680 nm, the wavelength width W1 is about 135 nm, the wavelength width W2 is about 115 nm, the reflectance difference H1 is about 0.6%, and the reflectance difference H2 is about 0.3%.

The Third Example

FIG. 12 shows a specific third example of the antireflection film (four-layer structure: Sub/x$_1$L/x$_2$M/yH/zL/Air). First, the constitutional material is as follows: the optical glass by HOYA Corporation (glass type: M-BACD12) is used for the base material of the concave meniscus lens 11. Further, in each layer constituting the antireflection film, the first layer 12a is made of aluminum oxide (Al$_2$O$_3$), and the second layer 12b is made of aluminum oxide (Al$_2$O$_3$), and the third layer 12c is made of an optical film material by Canon optron Inc., (product name: OH-5 (a mixed film of zirconium and titanium oxide (ZrO$_2$+TiO$_2$)), and a fourth layer 12d is made of magnesium fluoride (MgF$_2$). Further, the ratio of a mixed material constituting the third layer is ZrO$_2$:TiO$_2$=9:1. The following numerical range can be applied to the numerical values of x, y, z.

$x_1$=0.01 to 0.50×
$x_2$=1.00 to 1.60
y=0.70 to 2.30
z=0.70 to 1.30

The film structure of each layer is shown in FIG. 11.

(The Method of Manufacturing the Antireflection Film)

The antireflection film with the above-mentioned structure is formed by the vacuum vapor deposition, similarly to the above-mentioned first example. A specific forming condition is described hereafter.

Figure 13:
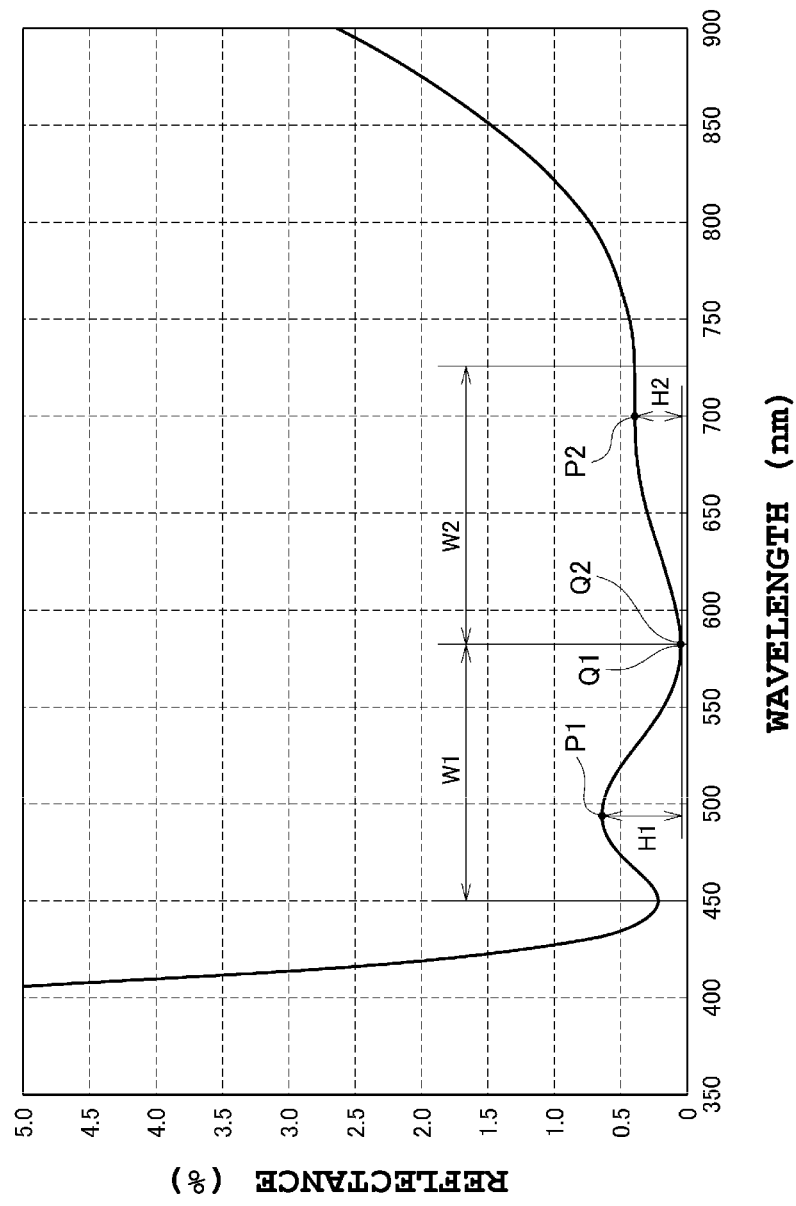
FIG. 13 is a view showing the spectral reflectance property of the antireflection film according to the third example.

The first layer: forming condition of the $SiO_2$ film
The film formation of the first layer is performed once.
    Substrate heating: about 260° C. (a range of 250° C. to 270° C. is acceptable)
    Introduction of oxygen: none
    Deposition rate: about 1.0 nm/sec The second layer: forming condition of $Al_2O_3$
The film formation of the second layer is performed once.
    Substrate heating: about 260° C. (a range of 250° C. to 270° C. is acceptable)
    Vacuum degree during film formation after introducing oxygen: $7.2 \times 10^{-3}$ Pa (a range of 7.1 to $7.3 \times 10^{-3}$ Pa is acceptable)
    Deposition rate: about 0.8 nm/sec The third layer: forming condition of the $ZrO_2+TiO_2$ film
The film formation of the third layer is performed once.
    Substrate heating: about 260° C. (a range of 250° C. to 270° C. is acceptable)
    Vacuum degree during film formation after introducing oxygen: $8.5 \times 10^{-3}$ Pa (a range of 8.4 to $8.6 \times 10^{-3}$ Pa is acceptable)
    Deposition rate: about 0.8 nm/sec The fourth layer: forming condition of the $MgF_2$ film
The film formation of the fourth layer is performed once.
    Substrate heating: about 260° C. (a range of 250° C. to 270° C. is acceptable)
    Introduction of oxygen: none
    Deposition rate: about 1.0 nm/sec FIG. 13 is a view showing the spectral reflection property of the antireflection film according to a third example. In the spectral reflection property shown in the figure, the wavelength at the maximum reflectance P1 is about 490 nm, the wavelength at the maximum reflectance P2 is about 700 nm, the wavelength width W1 is about 130 nm, the wavelength width W2 is about 150 nm, the reflectance difference H1 is about 0.6%, and the reflectance difference H2 is about 0.3%.

Regarding the film structure of the above-mentioned example, explanation is given for the antireflection film having a three-layer structure including the first layer having the refractive index M, the second layer having the refractive index H, and the third layer having the refractive index L. The first layer can be replaced by the following equivalent film structure composed of a plurality of layers having the refractive index M.

Specifically, as shown in FIG. 14, the film structure of the antireflection film is a five-layer structure in which the refractive index of the first layer is L, the refractive index of the second layer is H, the refractive index of the third layer is L, the refractive index of the fourth layer is H, and the refractive index of the fifth layer is L. In this case, three layers in combination of the first layer to the third layer is equivalently regarded as a single layer (first layer) having the reflectance M. In addition, for example, two layers in combination of the second layer and the third layer is equivalently regarded as a single layer (first layer) having the reflectance M.

As shown in FIG. 16, in a case of a six-layer film structure of the antireflection film in which the refractive index of the first layer is H, the refractive index of the second layer is L, the refractive index of the third layer is H, the refractive index of the fourth layer is L, the refractive index of the fifth layer is H, and the refractive index of the sixth layer is L, four layers in combination of the first layer to the fourth layer is equivalently regarded as a single layer (first layer) having the reflectance M. In addition, for example, two layers in combination of the first layer and the second layer is equivalently regarded as a single layer (first layer) having the reflectance M, or two layers in combination of the third layer and the fourth layer is equivalently regarded as a single layer (first layer) having the reflectance M.

As shown in FIG. 18, in a case of a seven-layer film structure of the antireflection film in which the refractive index of the first layer is L, the refractive index of the second layer is H, the refractive index of the third layer is L, the refractive index of the fourth layer is H, the refractive index of the fifth layer is L, the refractive index of the sixth layer is H, and the refractive index of the seventh layer is L, five layers in combination of the first layer to the fifth layer is equivalently regarded as a single layer (first layer) having the reflectance M. In addition, for example, three layers in combination of the first layer to the third layer is equivalently regarded as a single layer (first layer) having the reflectance M, or two layers in combination of the fourth layer and the fifth layer is equivalently regarded as a single layer (first layer) having the reflectance M.

Explanation is given hereafter more specifically.

Fourth Example

A Modified Example of the First Example

FIG. 14 shows a specific fourth example of the antireflection film (a five-layer film structure: Sub/($x_1$L/$y_1$H/$x_2$L/$y_2$H/zl/Air) (numerals are attached for identifying each symbol). First, the constitutional material is as follows: the optical glass by HOYA Corporation (glass type: M-TAFD305) is used for the base material of the concave meniscus lens 11. Further, In each layer constituting the antireflection film, the first layer 12a is made of magnesium fluoride ($MgF_2$), and the second layer 12b is made of zirconium oxide ($ZrO_2$), and the third layer 12c is made of magnesium fluoride ($MgF_2$), and the fourth layer 12d is made of zirconium oxide ($ZrO_2$), and the fifth layer is made of magnesium fluoride ($MgF_2$). Further, the following numerical range can be applied to the numerical values of x, y, z.

$x_1$=0.01 to 0.50
$x_2$=1.00 to 1.50
$y_1$=0.30 to 0.90
$y_2$=0.70 to 2.60
z=0.70 to 1.30

The film structure of each layer is shown in FIG. 14.

(The Method of Manufacturing the Antireflection Film)

The antireflection film with the above-mentioned structure is formed by the vacuum vapor deposition, similarly to the above-mentioned first example. A specific forming condition is described hereafter.

Figure 15:
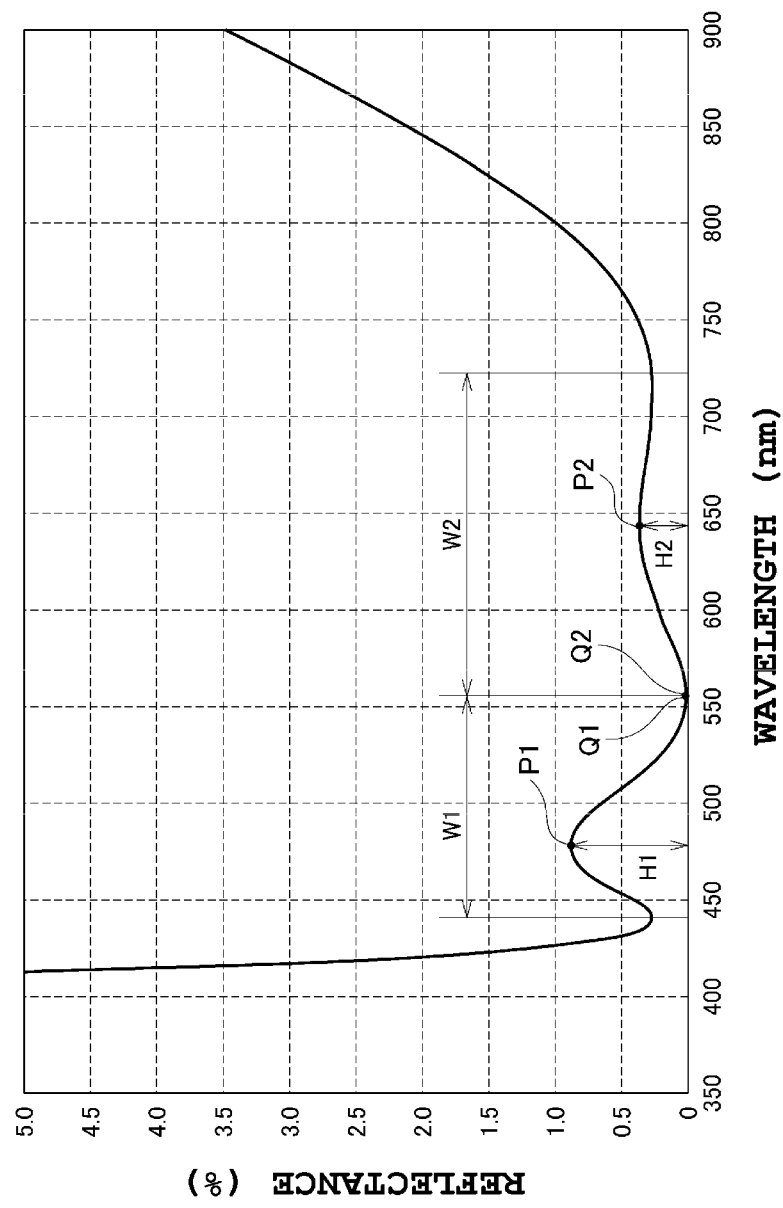
FIG. 15 is a view showing the spectral reflectance property of the antireflection film according to the fourth example.

The first layer: forming condition of the $MgF_2$ film
The film formation of the first layer is performed once.
    Substrate heating: about 260° C. (a range of 250° C. to 270° C. is acceptable)
    Introduction of oxygen: none
    Deposition rate: about 1.0 nm/sec The second layer: forming condition of $ZrO_2$ film
The film formation of the second layer is performed once.
    Substrate heating: about 260° C. (a range of 250° C. to 270° C. is acceptable)
    Introduction of oxygen: none
    Deposition rate: about 0.8 nm/sec
The third layer: forming condition of $MgF_2$ film
The film formation of the third layer is performed once.
    Substrate heating: about 260° C. (a range of 250° C. to 270° C. is acceptable)
    Introduction of oxygen: none
    Deposition rate: about 1.0 nm/sec
The fourth layer: Forming condition of $ZrO_2$ film
The film formation of the fourth layer is performed once.
    Substrate heating: about 260° C. (a range of 250° C. to 270° C. is acceptable)
    Introduction of oxygen: none
    Deposition rate: about 0.8 nm/sec
The fifth layer: forming condition of $MgF_2$ film
The film formation of the fifth layer is performed once.
    Substrate heating: about 260° C. (a range of 250° C. to 270° C. is acceptable)
    Introduction of oxygen: none
    Deposition rate: about 1.0 nm/sec FIG. 15 is a view showing the spectral reflection property of the antireflection film according to a fourth example. In the spectral reflection property shown in the figure, the wavelength at the maximum reflectance P1 is about 480 nm, the wavelength at the maximum reflectance P2 is about 640 nm, the wavelength width W1 is about 120 nm, the wavelength width W2 is about 170 nm, the reflectance difference H1 is about 0.8%, and the reflectance difference H2 is about 0.35%.

A Fifth Example

The Modified Example of the First Example

FIG. 16 shows a specific fifth example of the antireflection film (six-layer film structure: $Sub/y_1H/x_1L/y_2H/x_2L/y_3H/zL/Air$) (numerals are attached for identifying each symbol). First, the constitutional material is as follows: the optical glass by HOYA Corporation (glass type: M-TAFD305) is used for the base material of the concave meniscus lens 11. Further, In each layer constituting the antireflection film, the first layer 12a is made of zirconium oxide ($ZrO_2$), and the second layer 12b is made of magnesium fluoride ($MgF_2$), and the third layer 12c is made of zirconium oxide ($ZrO_2$), and the fourth layer is made of magnesium fluoride ($MgF_2$), and the fifth layer is made of zirconium oxide ($ZrO_2$), and the sixth layer is made of magnesium fluoride ($MgF_2$). The following numerical range can be applied to the numerical values of x, y, z.
$x_1$=0.01 to 0.50
$x_2$=0.01 to 0.50
$y_1$=0.10 to 0.80
$y_2$=0.90 to 1.60
$y_3$=0.20 to 0.90
z=0.70 to 1.30
The film structure of each layer is shown in FIG. 16.
(The Method of Manufacturing an Antireflection Film)
The antireflection film with the above-mentioned structure is formed by the vacuum vapor deposition, similarly to the above-mentioned first example. A specific forming condition is described hereafter.
The first layer: forming condition of the $ZrO_2$ film
The film formation of the first layer is performed once.
    Substrate heating: about 260° C. (a range of 250° C. to 270° C. is acceptable)
    Introduction of oxygen: none
    Deposition rate: about 0.8 nm/sec
The second layer: forming condition of the $MgF_2$ film
The film formation of the second layer is performed once.
    Substrate heating: about 260° C. (a range of 250° C. to 270° C. is acceptable)
    Introduction of oxygen: none
    Deposition rate: about 1.0 nm/sec
The third layer: forming condition of the $ZrO_2$ film
The film formation of the third layer is performed once.
    Substrate heating: about 260° C. (a range of 250° C. to 270° C. is acceptable)
    Introduction of oxygen: none
    *Deposition rate: about 0.8 nm/sec
The fourth layer: forming condition of the $MgF_2$ film
The film formation of the fourth layer is performed once.
    Substrate heating: about 260° C. (a range of 250° C. to 270° C. is acceptable)
    Introduction of oxygen: none
    Deposition rate: about 1.0 nm/sec.
The fifth layer: forming condition of the $ZrO_2$ film
The film formation of the fifth layer is performed once.
    Substrate heating: about 260° C. (a range of 250° C. to 270° C. is acceptable)
    Introduction of oxygen: none Deposition rate: about 0.8 nm/sec.
The sixth layer: forming condition of the $MgF_2$ film
The film formation of the sixth layer is performed once.
    Substrate heating: about 260° C. (a range of 250° C. to 270° C. is acceptable)
    Introduction of oxygen: none
    Deposition rate: about 1.0 nm/sec.

Figure 17:
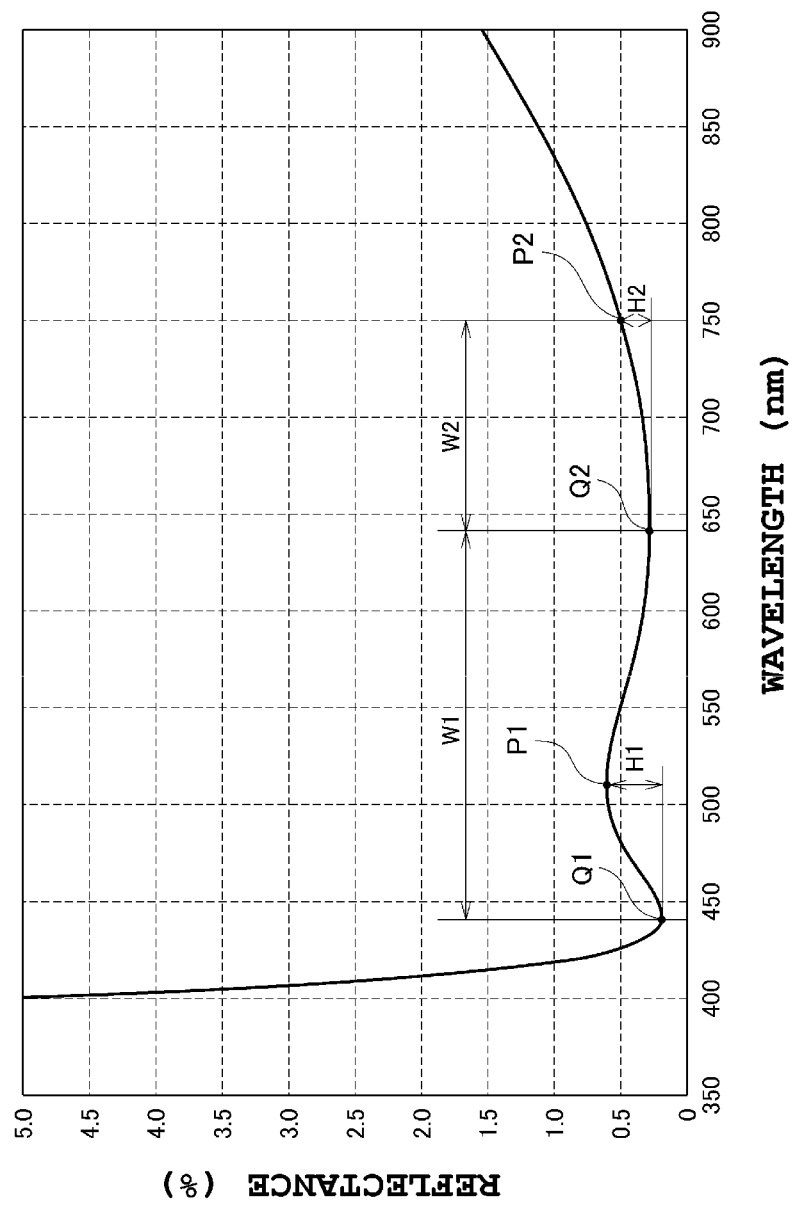
FIG. 17 is a view showing the spectral reflectance property of the antireflection film according to the fifth example.

FIG. 17 is a view showing the spectral reflection property of the antireflection film according to a fifth example. In the spectral reflection property shown in the figure, the wavelength at the maximum reflectance P1 is about 515 nm, the wavelength at the maximum reflectance P2 is about 750 nm, the wavelength width W1 is about 200 nm, the wavelength width W2 is about 110 nm, the reflectance difference H1 is about 0.5%, and the reflectance difference H2 is about 0.2%.

Sixth Example

The Modified Example of the First Example

FIG. 18 shows a specific sixth example of the antireflection film (seventh-layer structure: $Sub/x_1L/y_1H/x_2L/y_2H/x_3L/y_3H/zL/Air$). First, the constitutional material is as follows: the optical glass by HOYA Corporation (glass type: M-TAFD305) is used for the base material of the concave meniscus lens 11. Further, in each layer constituting the antireflection film, the first layer 12a is made of magnesium fluoride ($MfF_2$), and the second layer 12b is made of zirconium oxide ($ZrO_2$), and the third layer 12c is made of magnesium fluoride ($MgF_2$), and the fourth layer 12d is made of zirconium oxide ($ZrO_2$), and the fifth layer 12e is made of magnesium fluoride ($MgF_2$), and the sixth layer 12f is made of zirconium oxide ($ZrO_2$), and the seventh layer 12g is made of magnesium fluoride ($MgF_2$). The following numerical range can be applied to the numerical values of x, y, z.
$x_1$=0.01 to 0.50
$x_2$=0.01 TO 0.60
$x3$=0.01 to 0.50
y1=0.30 to 1.00
y2=0.80 to 1.50 y3=0.40 to 1.00
z=0.70 to 1.30
The film structure of each layer is shown in FIG. 18.
(The Method of Manufacturing an Antireflection Film)

The antireflection film with the above-mentioned structure is formed by the vacuum vapor deposition, similarly to the above-mentioned first example. A specific forming condition is described hereafter.

The first layer: forming condition of the $MgF_2$ film
The film formation of the fifth layer is performed once.
    Substrate heating: about 260° C. (a range of 250° C. to 270° C. is acceptable)
    Introduction of oxygen: none
    Deposition rate: about 1.0 nm/sec.
The second layer: forming condition of the $ZrO_2$ film
The film formation of the second layer is performed once.
    Substrate heating: about 260° C. (a range of 250° C. to 270° C. is acceptable)
    Introduction of oxygen: none
    Deposition rate: about 0.8 nm/sec.
The third layer: forming condition of the $MgF_2$ film
The film formation of the third layer is performed once.
    Substrate heating: about 260° C. (a range of 250° C. to 270° C. is acceptable)
    Introduction of oxygen: none
    Deposition rate: about 1.0 nm/sec.
The fourth layer: forming condition of the $ZrO_2$ film
The film formation of the third layer is performed once.
    Substrate heating: about 260° C. (a range of 250° C. to 270° C. is acceptable)
    Introduction of oxygen: none
    Deposition rate: about 0.8 nm/sec.
The fifth layer: forming condition of the $MgF_2$ film
The film formation of the fifth layer is performed once.
    Substrate heating: about 260° C. (a range of 250° C. to 270° C. is acceptable)
    Introduction of oxygen: none
    Deposition rate: about 1.0 nm/sec.
The sixth layer: forming condition of the $ZrO_2$ film
The film formation of the sixth layer is performed once.
    Substrate heating: about 260° C. (a range of 250° C. to 270° C. is acceptable)
    Introduction of oxygen: none
    Deposition rate: about 0.8 nm/sec.
The seventh layer: forming condition of the $MgF_2$ film
The film formation of the seventh layer is performed once.
    Substrate heating: about 260° C. (a range of 250° C. to 270° C. is acceptable)
    Introduction of oxygen: none
    Deposition rate: about 1.0 nm/sec.

Figure 19:
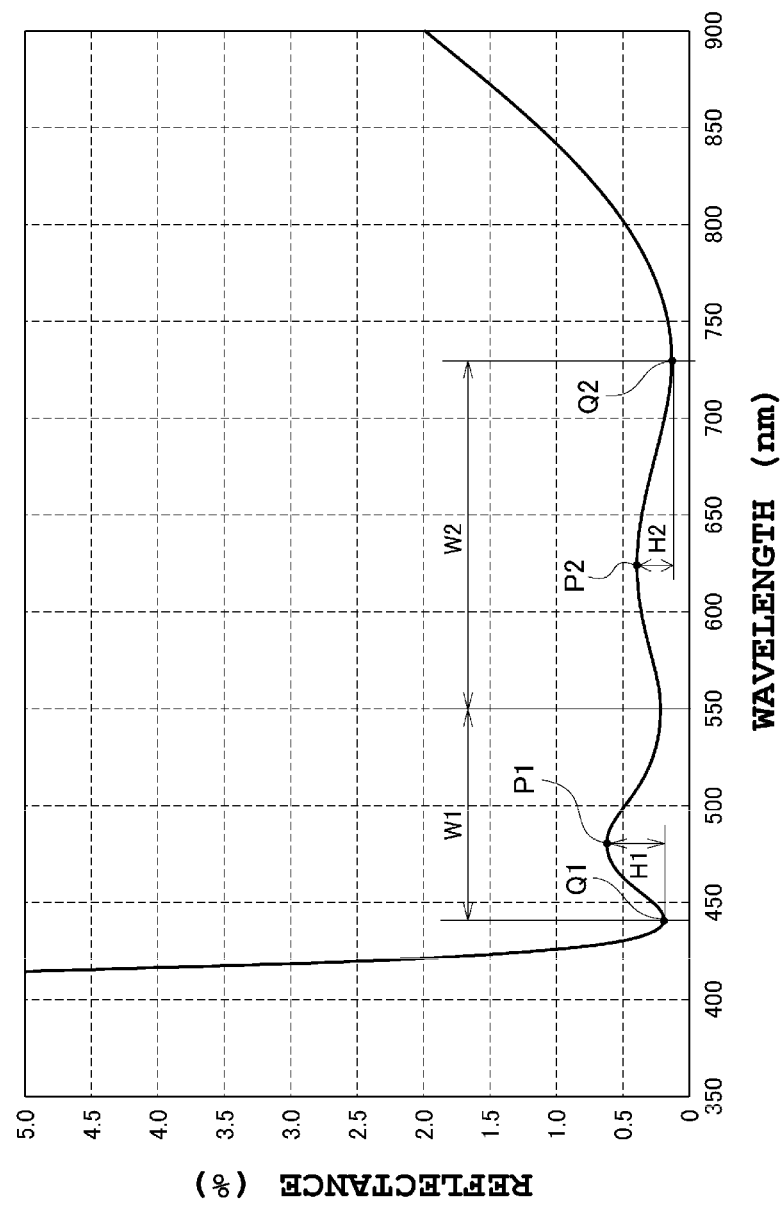
FIG. 19 is a view showing the spectral reflectance property of the antireflection film according to the sixth example.

FIG. 19 shows the spectral reflection property of the antireflection film according to a sixth example. In the spectral reflection property shown in the figure, the wavelength at the maximum reflectance P1 is about 480 nm, the wavelength at the maximum reflectance P2 is about 630 nm, the wavelength width W1 is about 110 nm, the wavelength width W2 is about 180 nm, the reflectance difference H1 is about 0.4%, and the reflectance difference H2 is about 0.2%.

In the above-mentioned first example to the third example, explanation is given for the three-layer film structure (the first layer has the refractive index M, the second layer has the refractive index H, and the third layer has the refractive index L). However, in the above-mentioned fourth example to the sixth example, explanation is given for a case that the antireflection film is replaced by the equivalent film composed of a plurality of films of three layers to five layers, which are equivalent to the first layer having the refractive index M.

Regarding the fourth example, the first layer to the fifth layer shown in FIG. 14 are described for the convenience of the explanation. However, a film equivalent to the first layer having the refractive index M is composed of the first layer to the third layer shown in FIG. 14, and the second layer is composed of the fourth layer of FIG. 14, and the third layer is composed of the fifth layer of FIG. 15.

Regarding the fifth example, similarly to the fourth example, a film equivalent to the first layer having the refractive index M, is composed of the first layer to the fourth layer shown in FIG. 16, the second layer is composed of the fifth layer of FIG. 16, and the third layer is composed of the sixth layer of FIG. 16.

Further, regarding the sixth example, similarly to the fourth and fifth examples, a film equivalent to the first layer having the refractive index M, is composed of the first layer to the fifth layer shown in FIG. 18, and the second layer is composed of the sixth layer of FIG. 18, and the third layer is composed of the seventh layer of FIG. 18.

As is clarified from FIG. 14, FIG. 16, and FIG. 18, each layer forming the first layer is formed so that refractive indexes L and H are alternately arranged. Wherein, the refractive index L of the layer forming an uppermost layer of the first layer (the third layer of FIG. 14, the fourth layer of FIG. 16, and the fifth layer of FIG. 18) becomes small compared with the refractive index H of the second layer (the fourth layer of FIG. 14, the fifth layer of FIG. 16, and the sixth layer of FIG. 18).

In the above-mentioned explanation, a case of the film structure in which the first layer has the refractive index M, the second layer has the refractive index H, and the third layer has the refractive index L, is taken for example for the explanation. However, the following film structure is also acceptable: the first layer has the refractive index M, the second layer has the refractive index L, and the third layer has the refractive index H. In this case as well, the first layer having the refractive index M can be replaced by the equivalent film composed of a plurality of layers.

(Priority by Shifting the Optical Property)

Generally, when the antireflection film is formed by the vacuum vapor deposition, etc., on the optical surface formed into the spherical surface or the aspherical surface, a desired film thickness is sometimes not obtained on the circumferential edge of the lens away from the center of the lens, even if the film forming condition is set so that the center of the lens has a desired film thickness. More specifically, the film thickness is likely to be gradually thin toward a lens circumferential edge portion from a lens center portion. In this case, a difference is generated in the spectral reflection property of the antireflection film between the lens center portion and the lens circumferential edge portion. Specifically, there is a tendency that the wavelength region of a low reflection is shifted to the short wavelength side, as the film thickness of the antireflection film becomes thinner. Particularly, in a case of the concave meniscus lens 11 with the above-mentioned optical functional surface formed into an aspherical shape, the above-mentioned tendency becomes strong. This is because a second surface r2 is formed into an aspherical concave surface, and its surface angle becomes steep from the lens center portion to the lens circumferential edge portion, thus making the film thickness thin during film formation. A maximum surface angle on the concave surface of the aspherical concave meniscus lens to which the present invention can be applied, can be set to 40 to 70° for example.

In this case, by shifting the wavelength range where the reflectance is a specific value (for example, 1.0%) or less, to the wavelength side longer than the wavelength region of red color, an excellent antireflection effect can be obtained over the whole region in a diameter direction of the lens, even if the wavelength region where the reflection is low, is shifted to the short wavelength side due to a variation of the film thickness during film formation. Further, there is a technique of forming the antireflection film with a uniform film thickness over the spherical surface and the aspherical surface (called "a film thickness equalizing technique" hereafter). However, according to the present invention, the reflectance property of the whole body of the lens can be satisfactorily maintained, even if not using such a technique. However, the present invention does not exclude the antireflection film to which the film thickness equalizing technique is applied.

Further, in a case of the concave meniscus lens with the optical surface formed into the spherical surface, the optical surface has a constant curvature, and therefore there is a tendency that the ghost light reflected by the optical surface is uniformly dispersed on the imaging surface. Meanwhile, in a case of the concave meniscus lens with the optical surface formed into the aspherical surface, the surface angle of the optical surface is not uniform, and therefore there is a tendency that the ghost light reflected by the optical surface is concentrated on a part of the imaging surface. Therefore, in a case of the former concave meniscus lens, even if the ghost is sufficiently suppressed to be low by forming the antireflection film, a remarkable red ghost is sometimes generated in a part of an image, when the antireflection film having the same spectral reflection property is formed on the latter concave meniscus lens. Particularly, in a case of the concave meniscus lens having the optical surface formed into the concave surface in which the surface angle becomes steep on the lens circumferential edge portion, an angle formed by an optical axis of the lens and the optical surface becomes suddenly large on the lens circumferential edge portion side, and therefore concentration of the ghost light easily occurs in a specific incident angle range. In such a case, by forming the antireflection film of the present invention on the optical surface, the ghost generated in the concave meniscus lens with the optical surface formed into the aspherical surface, can be considerably reduced by canceling a luminance difference between the ghosts, by using the antireflection film. However, the present invention is not limited to the aspherical lens, and can be applied to the spherical lens as well.

Here, a result of a simulation by the inventors of the present invention will be described using FIG. 20 and FIG. 21.

First, FIG. 20 and FIG. 21 show a luminance of the ghost of each color component of R (red), G (green), and B (blue) obtained by forming the antireflection film of the following conventional example, the example of the present invention, and the comparative example, on the second surface of the concave meniscus lens which is molded into the aspherical surface respectively. Further, in the figure, (A) shows a case of imaging at a wide angle, (B) shows a case of imaging at a standard angle, and (C) shows a case of imaging in a telescopic mode.

Conventional Example

The antireflection film having the spectral reflection property shown by a dot line curve in FIG. 2.

Example

The antireflection film having the spectral reflection property shown by a solid curve in FIG. 2.

Comparative Example

The antireflection film having the spectral reflection property in which the antireflection film is composed of nine layers, and the wavelength band of a low reflection is expanded to be wide from the visible light region to an infrared light region.

The luminance of RGB obtained by using the antireflection film of a conventional example is expressed by "L1", and the luminance of RGB of the ghost obtained by using the antireflection film of the example of the present invention is expressed by "L2", and a ratio of the luminance L2 with respect to the luminance L1 is expressed by "ΔLa" regarding each luminance and each incident angle of RGB. Meanwhile, in FIGS. 21(A) to (C), the luminance of RGB obtained by using the antireflection film of the conventional example is expressed by "L1", the luminance of RGB obtained by using the antireflection film of the comparative example is expressed by "L3", and a variation rate of the luminance L3 when the luminance L1 is 100% is expressed by "ΔLb".

As is clarified from the result of the simulation shown in the figure, in a case of using the antireflection film of the example of the present invention, the luminance of R of the ghost of this example is reduced to about twenty-several % of the luminance of the conventional example (reduced by about 80%), compared with a case of using the antireflection film of the conventional example. Meanwhile, even in a case of using the antireflection film of the comparative example, although the luminance of R is considerably reduced compared with a case of using the antireflection film of the conventional example, a degree of reduction is small compared with a case of the example of the present invention. Further, in a case of using the antireflection film of the example of the present invention, although the luminance of G and B is slightly reduced compared with a case of using the antireflection film of the conventional example, the degree of reduction is substantially within a range of 60% to 100%. Therefore, when the antireflection film of the example of the present invention is used, the ghost can be reduced while suppressing the deterioration of a color balance of the ghost part and by reducing the luminance of R. Further, as is clarified from a comparison of (A) to (C) of FIG. 20, a reduction rate of the luminance of R is highest in a case of a wide angle imaging, compared with a case of a standard imaging or a telescopic imaging. This reveals a fact that when the antireflection film of the example of the present invention is used, a remarkable effect can be exhibited particularly by imaging at a wide angle.

In the result of an actual experiment performed by the inventors of the present invention, the ghost (mainly red color) generated in a range of the incident angle of 40 degrees to 70 degrees, is improved to a level not allowing almost no ghost to be conspicuous by visual evaluation.

Meanwhile, when the antireflection film of the comparative example is used, the luminance of B is increased by 130% or more, and 200% or more at maximum, compared with a case of using the antireflection film of the conventional example. Therefore, it can be considered as follows: when the antireflection film of the conventional example is used, even if the generation of the ghost is suppressed by the reduction of the luminance of R, the luminance of blue color in the ghost part becomes strong by excessive increase of the luminance of B, thus remarkably reducing an image quality. Further, when the antireflection film of the comparative example is used, as shown in (B) and (C) of FIG. 21, in the standard imaging, the luminance of G is excessively high at incident angles 42 degrees and 43 degrees, and in the telescopic imaging, the luminance of G is excessively high at incident angles 54 degrees and 55 degrees. This point is also considered to be a factor of reducing the image quality.

(The Spectral Reflection Property to an Obliquely Incident Light Beam)

In the above-mentioned embodiment, FIG. 1 shows the spectral reflection property at an incident angle of 0 degree, as an optical property of the antireflection film. However, the spectral reflection property in a case of the incident angle exceeding 0 degree is shown below.

FIG. 22 is a view showing the spectral reflection property in consideration of a film thickness distribution at incident angles of 20 degrees and 30 degrees.

FIG. 23 shows the spectral reflection property in consideration of the film thickness distribution at incident angles of 40 degrees and 50 degrees.

FIG. 24 is a view showing the spectral reflection property in consideration of the film thickness distribution at incident angles of 60 degrees and 70 degrees.

Modified Example, Etc

A technical range of the present invention is not limited to the above-mentioned embodiment, and includes various modifications and improvements in a range of introducing a specific effect obtained by constituting features of the invention or a combination of them.

For example, the parameter such as the constitutional material, the refractive index, and the film thickness, etc., of the antireflection film, and the base material of the lens, etc., on which the antireflection film is formed, may be suitably changed.

According to the present invention, not only the above-mentioned antireflection film 12 and the optical element 10, but also the imaging optical system is realized in which the optical element 10 including the antireflection film 12 is provided, and the light incident on the optical element 10 is picked-up, and also the imaging optical system may be realized in which an imaging element is provided for receiving the light imaged by the imaging optical system. In such a case, a lens unit for a camera can be considered as an example of the imaging optical system. Moreover, a photographic camera, etc., can be considered as an example of the imaging optical system.

Further, when the ghost remains (conspicuous) even if the present invention is applied, the reduction of the ghost may be achieved by image processing or using a color filter together. Namely, the present invention does not exclude a case of using a technique of reducing the ghost by the image processing or by using the color filter.

(Supplementary Description)

Preferred other embodiment of the present invention will be supplementarily described hereafter.

[Supplementary Description 1]

There is provided an antireflection film formed on an optical surface of an optical member, and is configured to prevent a reflection of a light beam incident on the optical surface, wherein a reflectance in a wavelength region of yellow color to red color is decreased, and a reflectance in a wavelength region of blue color to green color is increased so that a luminance difference becomes small between a ghost in a wavelength region of yellow color to red color and a ghost in a wavelength region of blue color to green color.

[Supplementary Description 2]

There is provided the antireflection film according to the supplementary description 1, wherein the reflectance in the wavelength region of yellow color to red color is decreased by shifting a wavelength range where a reflectance is a prescribed value or less, to a wavelength side longer than a wavelength region of yellow color to red color, as a spectral reflectance property when a light beam is incident on the optical surface at an incident angle of 0 degree.

[Supplementary Description 3]

There is provided the antireflection film according to the supplementary description 1 or the supplementary description 2, wherein a reflectance in a wavelength region of blue color to green color is increased, so that a reflectance R1 at a wavelength side shorter than a wavelength region of yellow color, and a reflectance R2 at a wavelength side longer than a wavelength region of yellow color, satisfy a relation of $R1 \geq R2$, as a spectral reflectance property when a light beam is incident on the optical surface at an incident angle of 0 degree.

[Supplementary Description 4]

There is provided an optical element including an optical member having an optical surface, and an antireflection film formed on the optical surface, wherein the antireflection film is the film of reducing a wavelength region of yellow color to red color, and increasing a wavelength region of blue color to green color so that a luminance difference becomes small between a ghost in the wavelength region of yellow color to red color and a ghost in the wavelength region of blue color to green color.

[Supplementary Description 5]

There is provided the optical element according to the supplementary description 4, wherein the optical member is a concave meniscus lens having an aspherical concave surface, and the antireflection film is formed on the concave surface of the concave menisucus lens.

[Supplementary Description 6]

There is provided a design method of an antireflection film, which is a design method of an antireflection film formed on an optical surface of an optical member and is configured to prevent a reflection of a light beam incident on the optical surface, having a spectral reflectance property in which a reflectance in a wavelength region of red color is decreased, and a reflectance in a wavelength region of blue color is increased so that a luminance difference becomes small between a ghost in the wavelength region of red color and a ghost in the wavelength region of blue color.

[Supplementary Description 7]

There is provided a method of manufacturing an antireflection film, which is a method of manufacturing an antireflection film formed on an optical surface of an optical member and is configured to prevent a reflection of a light beam incident on the optical surface, wherein a film formation is performed to achieve a spectral reflectance property in which a reflectance in a wavelength region of red color is decreased, and a reflectance in a wavelength region of blue color is increased so that a luminance difference becomes small between a ghost in the wavelength region of red color and a ghost in the wavelength region of blue color.

[Supplementary Description 8]

There is provided an image forming optical system, using an optical element including an optical member having an optical surface, and an antireflection film formed on the optical surface, wherein the antireflection film is the film of reducing a reflectance in a wavelength region of red color, and increasing a reflectance in a wavelength region of blue color so that a luminance difference becomes small between a ghost in the wavelength region of red color and a ghost in the wavelength region of blue color.

[Supplementary Description 9]

There is provided an imaging optical system, including:

the image forming optical system described in the supplementary description 8; and an imaging element that receives a light imaged by the imaging optical system.

What is claimed is:

1. An antireflection film formed on an optical surface of an optical member, and configured to prevent a reflection of a light beam incident on the optical surface, the antireflection film comprising:
    a first wavelength region in which a distribution width by wavelength conversion is 50 nm or more and 200 nm or less; and
    a second wavelength region in which a distribution width by wavelength conversion is 180 nm or less,
    as a spectral reflectance property when a light beam is incident on the optical surface at an incident angle of 0 degree,
    wherein the first wavelength region includes:
    a first bottom part provided in a wavelength range of 400 nm or more; and
    a second bottom part being at a wavelength side longer than the first bottom part and provided adjacent to the first bottom part,
    wherein the second wavelength region is provided continuously from the second bottom part at a wavelength side longer than second bottom part,
    wherein in the spectral reflectance property, a maximum reflectance P1 in the first wavelength region and a maximum reflectance P2 in the second wavelength region satisfies a relation of P1>P2; and
    by shifting a wavelength range where the reflectance is a specific value or less, to a wavelength side longer than the second wavelength region, the reflectance in the second wavelength region is decreased, and the reflectance in the first wavelength region is increased so that a luminance difference is small between a ghost in the first wavelength region and a ghost in the second wavelength region.

2. The antireflection film according to claim 1, comprising:
    a first layer having a first refractive index;
    a second layer having a second refractive index; and
    a third layer having a third refractive index,
    which are sequentially laminated from the optical member side to an air side,
    wherein when the second refractive index is larger than the first refractive index and the first refractive index is larger than the third refractive index, a maximum value of a reflectance at a short wavelength side in a wavelength region of 450 nm to 550 nm when a light beam is incident on the optical surface at the incident angle of 0 degree, is larger than a maximum value of a reflectance at a long wavelength side in a wavelength region of 600 nm to 750 nm.

3. The antireflection film according to claim 2, wherein the first layer is composed of a plurality of layers in which at least one layer having the second refractive index and at least one layer having the third refractive index are combined.

4. The antireflection film according to claim 1, wherein a wavelength having the maximum reflectance P1 is 470 nm or more and less than 550 nm.

5. The antireflection film according to claim 2, wherein the first refractive index is 1.55 or more and less than 1.80, the second refractive index is 1.80 or more and 2.60 or less, and the third refractive index is 1.30 or more and less than 1.55.

6. The antireflection film according to claim 2, wherein the first layer is made of a material including any one of aluminum oxide, zirconium oxide, and silicon oxide, and the second layer is made of a material including any one of aluminum oxide, zirconium oxide, titanium oxide, niobium oxide, and tantalum oxide, and the third layer is made of a material including either magnesium fluoride or silicon oxide.

7. An optical element including an optical member having an optical surface, and an antireflection film formed on the optical surface,
    wherein the antireflection film comprises:
    a first wavelength region in which a distribution width by wavelength conversion is 50 nm or more and 200 nm or less; and
    a second wavelength region in which a distribution width by wavelength conversion is 180 nm or less,
    as a spectral reflectance property when a light beam is incident on the optical surface at an incident angle of 0 degree,
    wherein the first wavelength region includes:
    a first bottom part provided in a wavelength range of 400 nm or more; and
    a second bottom part being at a wavelength side longer than the first bottom part and provided adjacent to the first bottom part,
    wherein the second wavelength region is provided continuously from the second bottom part at a wavelength side longer than the second bottom part,
    wherein in the spectral reflectance property, a maximum reflectance P1 in the first wavelength region and a maximum reflectance P2 in the second wavelength region satisfies a relation of p1>P2; and
    by shifting a wavelength range where the reflectance is a specific value or less, to a wavelength side longer than the second wavelength region, the reflectance in the second wavelength region is decreased, and the reflectance in the first wavelength region is increased so that a luminance difference is small between a ghost in the first wavelength region and a ghost in the second wavelength region.

8. The optical element according to claim 7, wherein the optical member is a concave meniscus lens having a concave surface formed into an aspherical shape, and the antireflection film is formed on the concave surface of the concave meniscus lens.

* * * * *